United States Patent
Amm et al.

(10) Patent No.: US 6,829,092 B2
(45) Date of Patent: Dec. 7, 2004

(54) BLAZED GRATING LIGHT VALVE

(75) Inventors: David T. Amm, Kingston (CA); Jahja Trisnadi, Cupertino, CA (US); James Hunter, Campbell, CA (US); Christopher Gudeman, Los Gatos, CA (US); Dinesh Maheshwari, Fremont, CA (US)

(73) Assignee: Silicon Light Machines, Inc., Sunnyvale, CA (US)

( * ) Notice: Subject to any disclaimer, the term of this patent is extended or adjusted under 35 U.S.C. 154(b) by 0 days.

(21) Appl. No.: 09/930,838

(22) Filed: Aug. 15, 2001

(65) Prior Publication Data

US 2003/0035215 A1 Feb. 20, 2003

(51) Int. Cl.[7] .......................... G02B 26/00; G02B 27/44
(52) U.S. Cl. .................... 359/573; 359/291; 359/295
(58) Field of Search .............................. 359/573, 578, 359/290, 291, 295

(56) References Cited

U.S. PATENT DOCUMENTS

| | | | | | |
|---|---|---|---|---|---|
| 421,179 | A | * | 7/1890 | Gutin et al. ................. | 359/573 |
| 1,525,550 | A | * | 2/1925 | Jenkins ........................ | 359/291 |
| 1,548,262 | A | * | 8/1925 | Freedman .................... | 283/67 |
| RE16,767 | E | | 10/1927 | Jenkins | |
| 1,814,701 | A | * | 7/1931 | Ives ............................ | 359/462 |
| 2,415,226 | A | * | 2/1947 | Sziklai ........................ | 348/770 |
| 2,783,406 | A | * | 2/1957 | Vanderhooft ................ | 313/408 |
| 2,920,529 | A | * | 1/1960 | Blythe ......................... | 359/224 |
| 2,991,690 | A | * | 7/1961 | Grey et al. .................. | 359/462 |
| RE25,169 | E | | 5/1962 | Glenn | |

(List continued on next page.)

FOREIGN PATENT DOCUMENTS

| | | | | |
|---|---|---|---|---|
| DE | 32 33 195 A1 | 3/1983 | ........... | H01L/23/52 |
| DE | 43 23 799 A1 | 1/1994 | ........... | H01L/23/50 |
| DE | 197 23 618 A1 | 12/1997 | ............. | G03F/1/14 |

(List continued on next page.)

OTHER PUBLICATIONS

D.M. Burns, et al., "Development of microelectromechanical variable blaze gratings", Sensors and Actuators A64 (1998) 7–15.*

(List continued on next page.)

Primary Examiner—John Juba, Jr.
(74) Attorney, Agent, or Firm—Okamoto & Benedicto LLP

(57) ABSTRACT

A light modulator includes elongated elements arranged parallel to each other. In a first diffraction mode, the light modulator operates to diffract an incident light into at least two diffraction orders. In a second diffraction mode, the light modulator operates to diffract the incident light into a single diffraction order. Each of the elongated elements comprises a blaze profile, which preferably comprises a reflective stepped profile across a width of each of the elongated elements and which produces an effective blaze at a blaze angle. Alternatively, the blaze profile comprises a reflective surface angled at the blaze angle. Each of selected ones of the elongated elements comprise a first conductive element. The elongated elements produce the first diffraction when a first electrical bias is applied between the first conductive elements and a substrate. A relative height of the blazed portions are adjusted to produce the second diffraction when a second electrical bias is applied between the first conductive elements and the substrate. In an alternative embodiment, each of the elongated elements includes the first conductive element and multiple elongated elements are arranged in groupings, where each of the groupings includes at least three of the elongated elements. When the multiple elongated elements are at a first height, the incident light reflects from the elongated elements. When relative heights of the multiple elongated elements are adjusted by applying individual electrical biases between the first conductive elements and the substrate, the incident light diffracts into the single diffraction order.

20 Claims, 12 Drawing Sheets

U.S. PATENT DOCUMENTS

| | | | |
|---|---|---|---|
| 3,256,465 A * | 6/1966 | Weissenstern et al. ....... 257/777 |
| 3,388,301 A * | 6/1968 | James ......................... 257/778 |
| 3,443,871 A * | 5/1969 | Chitayat ..................... 356/498 |
| 3,553,364 A * | 1/1971 | Lee ............................ 359/230 |
| 3,576,394 A * | 4/1971 | Lee ............................ 348/740 |
| 3,600,798 A * | 8/1971 | Lee ............................ 29/592.1 |
| 3,656,837 A * | 4/1972 | Sandbank ................... 359/291 |
| 3,657,610 A * | 4/1972 | Yamamoto et al. ......... 257/778 |
| 3,693,239 A * | 9/1972 | Dix ............................ 228/105 |
| 3,743,507 A * | 7/1973 | Chung et al. .................. 430/2 |
| 3,752,563 A * | 8/1973 | Torok et al. ................ 359/280 |
| 3,781,465 A * | 12/1973 | Ernstoff et al. ............. 348/742 |
| 3,783,184 A * | 1/1974 | Ernstoff et al. ............. 348/742 |
| 3,792,916 A * | 2/1974 | Sarna ......................... 359/577 |
| 3,802,769 A * | 4/1974 | Rotz et al. .................... 352/43 |
| 3,811,186 A * | 5/1974 | Larnerd et al. ............... 29/840 |
| 3,861,784 A * | 1/1975 | Torok ......................... 359/573 |
| 3,862,360 A * | 1/1975 | Dill et al. ................... 348/792 |
| 3,871,014 A * | 3/1975 | King et al. ................. 257/779 |
| 3,896,338 A * | 7/1975 | Nathanson et al. ......... 315/373 |
| 3,915,548 A * | 10/1975 | Opittek et al. .................. 345/7 |
| 3,935,499 A * | 1/1976 | Oess ........................... 313/413 |
| 3,935,500 A * | 1/1976 | Oess et al. .................. 313/495 |
| 3,938,881 A * | 2/1976 | Biegelsen et al. ........... 359/305 |
| 3,941,456 A * | 3/1976 | Schilz et al. ................ 359/305 |
| 3,942,245 A * | 3/1976 | Jackson et al. ............... 29/827 |
| 3,943,281 A * | 3/1976 | Keller et al. ................ 348/206 |
| 3,947,105 A * | 3/1976 | Smith ......................... 353/121 |
| 3,969,611 A * | 7/1976 | Fonteneau .................. 219/502 |
| 3,980,476 A * | 9/1976 | Wysocki ....................... 430/2 |
| 3,991,416 A * | 11/1976 | Byles et al. .................. 345/87 |
| 4,001,663 A * | 1/1977 | Bray ............................ 363/37 |
| 4,004,849 A * | 1/1977 | Shattuck ..................... 359/245 |
| 4,006,968 A * | 2/1977 | Ernstoff et al. ............. 349/105 |
| 4,009,939 A * | 3/1977 | Okano ........................ 359/589 |
| 4,011,009 A * | 3/1977 | Lama et al. ................. 359/571 |
| 4,012,116 A * | 3/1977 | Yevick ........................ 359/465 |
| 4,012,835 A * | 3/1977 | Wallick ..................... 228/173.1 |
| 4,017,158 A * | 4/1977 | Booth ......................... 359/567 |
| 4,020,381 A * | 4/1977 | Oess et al. .................. 313/302 |
| 4,021,766 A * | 5/1977 | Aine ............................. 338/2 |
| 4,034,211 A * | 7/1977 | Horst et al. ................. 235/454 |
| 4,034,399 A | 7/1977 | Drukier et al. ............... 357/68 |
| 4,035,068 A | 7/1977 | Rawson ...................... 353/122 |
| 4,067,129 A | 1/1978 | Abramson et al. ............. 40/563 |
| 4,084,437 A | 4/1978 | Finnegan ..................... 73/361 |
| 4,090,219 A | 5/1978 | Ernstoff et al. ............... 358/59 |
| 4,093,346 A | 6/1978 | Nishino et al. ......... 350/162 NF |
| 4,093,921 A | 6/1978 | Buss ........................... 325/459 |
| 4,093,922 A | 6/1978 | Buss ........................... 325/459 |
| 4,100,579 A | 7/1978 | Ernstoff ...................... 358/230 |
| 4,103,273 A | 7/1978 | Keller ........................... 338/2 |
| 4,126,380 A | 11/1978 | Borm ......................... 350/266 |
| 4,127,322 A | 11/1978 | Jacobson et al. ............. 353/31 |
| 4,135,502 A | 1/1979 | Peck ......................... 128/76.5 |
| 4,139,257 A | 2/1979 | Matsumoto ................. 350/6.1 |
| 4,143,943 A | 3/1979 | Rawson ...................... 350/120 |
| 4,163,570 A | 8/1979 | Greenaway ................. 283/8 A |
| 4,184,700 A | 1/1980 | Greenaway .................... 283/6 |
| 4,185,891 A | 1/1980 | Kaestner .................... 350/167 |
| 4,190,855 A | 2/1980 | Inoue .......................... 357/80 |
| 4,195,915 A | 4/1980 | Lichty et al. ................ 350/345 |
| 4,205,428 A | 6/1980 | Ernstoff et al. ........... 29/592 R |
| 4,211,918 A | 7/1980 | Nyfeler et al. .............. 235/454 |
| 4,223,050 A | 9/1980 | Nyfeler et al. .............. 427/163 |
| 4,225,913 A | 9/1980 | Bray ............................ 363/97 |
| 4,249,796 A | 2/1981 | Sincerbox et al. .......... 350/370 |
| 4,250,217 A | 2/1981 | Greenaway ................. 428/161 |
| 4,250,393 A | 2/1981 | Greenaway ................. 250/566 |
| 4,256,787 A | 3/1981 | Shaver et al. .................. 428/1 |
| 4,257,016 A | 3/1981 | Kramer, Jr. et al. ........ 322/7.51 |
| 4,290,672 A | 9/1981 | Whitefield .................. 350/358 |
| 4,295,145 A | 10/1981 | Latta .......................... 346/108 |
| 4,311,999 A | 1/1982 | Upton et al. ................ 340/755 |
| 4,327,411 A | 4/1982 | Turner ........................ 364/900 |
| 4,327,966 A | 5/1982 | Bloom .................... 350/162 R |
| 4,331,972 A | 5/1982 | Rajchman .................... 358/60 |
| 4,336,982 A | 6/1982 | Rector, Jr. .................. 350/358 |
| 4,338,660 A | 7/1982 | Kelley et al. ................ 364/200 |
| 4,343,535 A | 8/1982 | Bleha, Jr. ................... 350/342 |
| 4,346,965 A | 8/1982 | Sprague et al. ............. 350/358 |
| 4,348,079 A | 9/1982 | Johnson ..................... 350/358 |
| 4,355,463 A | 10/1982 | Burns ........................... 29/827 |
| 4,361,384 A | 11/1982 | Bosserman ................. 350/174 |
| 4,369,524 A | 1/1983 | Rawson et al. ............. 455/606 |
| 4,374,397 A | 2/1983 | Mir ............................. 358/75 |
| 4,389,096 A | 6/1983 | Hori et al. ............... 350/339 R |
| 4,391,490 A | 7/1983 | Hartke ........................ 350/356 |
| 4,396,246 A | 8/1983 | Holman .................. 350/96.14 |
| 4,398,798 A | 8/1983 | Krawczak et al. ..... 350/162.24 |
| 4,400,740 A | 8/1983 | Traino et al. ............... 358/293 |
| 4,408,884 A | 10/1983 | Kleinknecht et al. ....... 356/355 |
| 4,414,583 A | 11/1983 | Hooker, III ................. 358/300 |
| 4,417,386 A | 11/1983 | Exner ......................... 29/590 |
| 4,418,397 A | 11/1983 | Brantingham et al. ...... 364/900 |
| 4,420,717 A | 12/1983 | Wallace et al. ............. 318/696 |
| 4,422,099 A | 12/1983 | Wolfe ......................... 358/293 |
| 4,426,768 A | 1/1984 | Black et al. .................. 29/583 |
| 4,430,584 A | 2/1984 | Someshwar et al. ........ 307/465 |
| 4,435,041 A | 3/1984 | Torok et al. ........... 350/162.24 |
| 4,440,839 A | 4/1984 | Mottier ......................... 430/2 |
| 4,443,819 A | 4/1984 | Funada et al. .............. 358/236 |
| 4,443,845 A | 4/1984 | Hamilton et al. ........... 364/200 |
| 4,447,881 A | 5/1984 | Brantingham et al. ...... 364/488 |
| 4,454,591 A | 6/1984 | Lou ............................ 364/900 |
| 4,456,338 A | 6/1984 | Gelbart ....................... 358/358 |
| 4,460,907 A | 7/1984 | Nelson .................... 346/153.1 |
| 4,462,046 A | 7/1984 | Spight ........................ 358/101 |
| 4,467,342 A | 8/1984 | Tower ......................... 357/30 |
| 4,468,725 A | 8/1984 | Venturini .................... 363/160 |
| 4,483,596 A | 11/1984 | Marshall .................... 350/385 |
| 4,484,188 A | 11/1984 | Ott ............................. 340/728 |
| 4,487,677 A | 12/1984 | Murphy ...................... 204/247 |
| 4,492,435 A | 1/1985 | Banton et al. .............. 350/360 |
| 4,503,494 A | 3/1985 | Hamilton et al. ........... 364/200 |
| 4,511,220 A | 4/1985 | Scully ........................ 350/403 |
| 4,538,883 A | 9/1985 | Sprague et al. ............. 350/356 |
| 4,545,610 A | 10/1985 | Lakritz et al. ................ 29/589 |
| 4,556,378 A | 12/1985 | Nyfeler et al. .............. 425/143 |
| 4,558,171 A | 12/1985 | Gantley et al. .......... 174/52 FP |
| 4,561,011 A * | 12/1985 | Kohara et al. .............. 257/713 |
| 4,561,044 A | 12/1985 | Ogura et al. ................. 362/84 |
| 4,567,585 A | 1/1986 | Gelbart ........................ 369/97 |
| 4,571,041 A | 2/1986 | Gaudyn ...................... 353/10 |
| 4,577,932 A | 3/1986 | Gelbart ....................... 350/358 |
| 4,577,933 A | 3/1986 | Yip et al. .................... 350/358 |
| 4,588,957 A | 5/1986 | Balant et al. ................ 330/4.3 |
| 4,590,548 A | 5/1986 | Maytum ..................... 363/161 |
| 4,594,501 A | 6/1986 | Culley et al. ............... 219/492 |
| 4,596,992 A | 6/1986 | Hornbeck ............... 346/46 PH |
| 4,615,595 A | 10/1986 | Hornbeck ................... 353/122 |
| 4,623,219 A | 11/1986 | Trias .......................... 350/351 |
| 4,636,039 A | 1/1987 | Turner ........................ 350/356 |
| 4,636,866 A | 1/1987 | Hattori ....................... 358/236 |
| 4,641,193 A | 2/1987 | Glenn ......................... 358/233 |
| 4,645,881 A | 2/1987 | LeToumelin et al. ....... 379/252 |
| 4,646,158 A | 2/1987 | Ohno et al. ................. 358/236 |
| 4,649,085 A | 3/1987 | Landram .................... 428/620 |
| 4,649,432 A | 3/1987 | Watanabe ................... 358/241 |
| 4,652,932 A | 3/1987 | Miyajima et al. ........... 358/236 |
| 4,655,539 A | 4/1987 | Caulfield et al. ............ 350/3.6 |

| Patent No. | Date | Inventor | Class |
|---|---|---|---|
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,031,144 A * | 7/1991 | Persky | 365/145 |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 137/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/151 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/233 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |

| Patent No. | | Date | Inventor | Class |
|---|---|---|---|---|
| 5,151,763 | A | 9/1992 | Marek et al. | 357/26 |
| 5,153,770 | A | 10/1992 | Harris | 359/245 |
| 5,155,604 | A | 10/1992 | Miekka et al. | 359/2 |
| 5,155,615 | A | 10/1992 | Tagawa | 359/213 |
| 5,155,778 | A | 10/1992 | Magel et al. | 385/18 |
| 5,155,812 | A | 10/1992 | Ehlig et al. | 395/275 |
| 5,157,304 | A | 10/1992 | Kane et al. | 313/495 |
| 5,159,485 | A | 10/1992 | Nelson | 359/291 |
| 5,161,042 | A | 11/1992 | Hamada | 359/41 |
| 5,162,787 | A | 11/1992 | Thompson et al. | 340/794 |
| 5,164,019 | A | 11/1992 | Sinton | 136/249 |
| 5,165,013 | A | 11/1992 | Faris | 395/104 |
| 5,168,401 | A | 12/1992 | Endriz | 359/625 |
| 5,168,406 | A | 12/1992 | Nelson | 359/855 |
| 5,170,156 | A | 12/1992 | DeMond et al. | 340/794 |
| 5,170,269 | A | 12/1992 | Lin et al. | 359/9 |
| 5,170,283 | A | 12/1992 | O'Brien et al | 359/291 |
| 5,172,161 | A | 12/1992 | Nelson | 355/200 |
| 5,172,262 | A | 12/1992 | Hornbeck | 359/223 |
| 5,177,724 | A | 1/1993 | Gelbart | 369/44.16 |
| 5,178,728 | A | 1/1993 | Boysel et al. | 156/656 |
| 5,179,274 | A | 1/1993 | Sampsell | 250/208.2 |
| 5,179,367 | A | 1/1993 | Shimizu | 340/700 |
| 5,181,231 | A | 1/1993 | Parikh et al. | 377/26 |
| 5,185,660 | A | 2/1993 | Um | 358/60 |
| 5,185,823 | A * | 2/1993 | Kaku et al. | 385/2 |
| 5,188,280 | A | 2/1993 | Nakao et al. | 228/123 |
| 5,189,404 | A | 2/1993 | Masimo et al. | 340/720 |
| 5,189,505 | A | 2/1993 | Bartelink | 257/419 |
| 5,191,405 | A | 3/1993 | Tomita et al. | 257/777 |
| 5,192,864 | A | 3/1993 | McEwen et al. | 250/234 |
| 5,192,946 | A | 3/1993 | Thompson et al. | 340/794 |
| 5,198,895 | A | 3/1993 | Vick | 358/103 |
| D334,557 | S | 4/1993 | Hunter et al. | D14/114 |
| D334,742 | S | 4/1993 | Hunter et al. | D14/113 |
| 5,202,785 | A | 4/1993 | Nelson | 359/214 |
| 5,206,629 | A | 4/1993 | DeMond et al. | 340/719 |
| 5,206,829 | A * | 4/1993 | Thakoor et al. | 365/117 |
| 5,208,818 | A | 5/1993 | Gelbart et al. | 372/30 |
| 5,208,891 | A | 5/1993 | Prysner | 385/116 |
| 5,210,637 | A | 5/1993 | Puzey | 359/263 |
| 5,212,115 | A | 5/1993 | Cho et al. | 437/208 |
| 5,212,555 | A | 5/1993 | Stoltz | 358/206 |
| 5,212,582 | A | 5/1993 | Nelson | 359/224 |
| 5,214,308 | A | 5/1993 | Nishiguchi et al. | 257/692 |
| 5,214,419 | A | 5/1993 | DeMond et al. | 340/794 |
| 5,214,420 | A | 5/1993 | Thompson et al. | 340/795 |
| 5,216,278 | A * | 6/1993 | Lin et al. | 257/688 |
| 5,216,537 | A | 6/1993 | Hornbeck | 359/291 |
| 5,216,544 | A | 6/1993 | Horikawa et al. | 359/622 |
| 5,219,794 | A | 6/1993 | Satoh et al. | 437/209 |
| 5,220,200 | A | 6/1993 | Blanton | 257/778 |
| 5,221,400 | A | 6/1993 | Staller et al. | 156/292 |
| 5,221,982 | A | 6/1993 | Faris | 359/93 |
| 5,224,088 | A | 6/1993 | Atiya | 369/97 |
| D337,320 | S | 7/1993 | Hunter et al. | D14/113 |
| 5,226,099 | A | 7/1993 | Mignardi et al. | 385/19 |
| 5,229,597 | A | 7/1993 | Fukatsu | |
| 5,230,005 | A | 7/1993 | Rubino et al. | 372/20 |
| 5,231,363 | A | 7/1993 | Sano et al. | 332/109 |
| 5,231,388 | A | 7/1993 | Stoltz | 340/783 |
| 5,231,432 | A | 7/1993 | Glenn | 353/31 |
| 5,233,456 | A | 8/1993 | Nelson | 359/214 |
| 5,233,460 | A | 8/1993 | Partlo et al. | 359/247 |
| 5,233,874 | A | 8/1993 | Putty et al. | 73/517 AV |
| 5,237,340 | A | 8/1993 | Nelson | 346/108 |
| 5,237,435 | A | 8/1993 | Kurematsu et al. | 359/41 |
| 5,239,448 | A | 8/1993 | Perkins et al. | 361/764 |
| 5,239,806 | A | 8/1993 | Maslakow | 53/432 |
| 5,240,818 | A | 8/1993 | Mignardi et al. | 430/321 |
| 5,245,686 | A | 9/1993 | Faris et al. | 385/120 |
| 5,247,180 | A | 9/1993 | Mitcham et al. | 250/492.1 |
| 5,247,593 | A | 9/1993 | Lin et al. | 385/17 |
| 5,249,245 | A | 9/1993 | Lebby et al. | 385/89 |
| 5,251,057 | A | 10/1993 | Guerin et al. | 359/249 |
| 5,251,058 | A | 10/1993 | MacArthur | 359/249 |
| 5,254,980 | A | 10/1993 | Hendrix et al. | 345/84 |
| 5,255,100 | A | 10/1993 | Urbanus | 358/231 |
| 5,256,869 | A | 10/1993 | Lin et al. | 250/201.9 |
| 5,258,325 | A | 11/1993 | Spitzer et al. | 437/86 |
| 5,260,718 | A | 11/1993 | Rommelmann et al. | 346/107 R |
| 5,260,798 | A | 11/1993 | Um et al. | 358/233 |
| 5,262,000 | A | 11/1993 | Welbourn et al. | 156/643 |
| 5,272,473 | A | 12/1993 | Thompson et al. | 345/7 |
| 5,278,652 | A | 1/1994 | Urbanus et al. | 358/160 |
| 5,278,925 | A | 1/1994 | Boysel et al. | 385/14 |
| 5,280,277 | A | 1/1994 | Hornbeck | 345/108 |
| 5,281,887 | A | 1/1994 | Engle | 310/335 |
| 5,281,957 | A | 1/1994 | Schoolman | 345/8 |
| 5,285,105 | A | 2/1994 | Cain | 257/672 |
| 5,285,196 | A | 2/1994 | Gale, Jr. | 345/108 |
| 5,285,407 | A | 2/1994 | Gale et al. | 365/189.11 |
| 5,287,096 | A | 2/1994 | Thompson et al. | 345/147 |
| 5,287,215 | A | 2/1994 | Warde et al. | 359/293 |
| 5,289,172 | A | 2/1994 | Gale, Jr. et al. | 345/108 |
| 5,291,317 | A | 3/1994 | Newswanger | 359/15 |
| 5,291,473 | A | 3/1994 | Pauli | 369/112 |
| 5,293,511 | A | 3/1994 | Poradish et al. | 257/434 |
| 5,296,408 | A | 3/1994 | Wilbarg et al. | 437/203 |
| 5,296,950 | A | 3/1994 | Lin et al. | 359/9 |
| 5,298,460 | A | 3/1994 | Nishiguchi et al. | 437/183 |
| 5,299,037 | A | 3/1994 | Sakata | 359/41 |
| 5,299,289 | A | 3/1994 | Omae et al. | 359/95 |
| 5,300,813 | A | 4/1994 | Joshi et al. | 257/752 |
| 5,301,062 | A | 4/1994 | Takahashi et al. | 359/567 |
| 5,303,043 | A | 4/1994 | Glenn | 348/40 |
| 5,303,055 | A | 4/1994 | Hendrix et al. | 348/40 |
| 5,307,056 | A | 4/1994 | Urbanus | 340/189 |
| 5,307,185 | A | 4/1994 | Jones et al. | 359/41 |
| 5,310,624 | A | 5/1994 | Ehrlich | 430/322 |
| 5,311,349 | A | 5/1994 | Anderson et al. | 359/223 |
| 5,312,513 | A | 5/1994 | Florence et al. | 156/643 |
| 5,313,479 | A | 5/1994 | Florence | 372/26 |
| 5,313,648 | A | 5/1994 | Ehlig et al. | 395/800 |
| 5,313,835 | A | 5/1994 | Dunn | 73/505 |
| 5,315,418 | A | 5/1994 | Sprague et al. | 359/41 |
| 5,315,423 | A | 5/1994 | Hong | 359/124 |
| 5,315,429 | A | 5/1994 | Abramov | |
| 5,319,214 | A | 6/1994 | Gregory et al. | 250/504 R |
| 5,319,668 | A | 6/1994 | Luecke | 372/107 |
| 5,319,789 | A | 6/1994 | Ehlig et al. | 395/800 |
| 5,319,792 | A | 6/1994 | Ehlig et al. | 395/800 |
| 5,320,709 | A * | 6/1994 | Bowden et al. | 438/745 |
| 5,321,416 | A | 6/1994 | Bassett et al. | 345/8 |
| 5,323,002 | A | 6/1994 | Sampsell et al. | 250/252.1 |
| 5,323,051 | A | 6/1994 | Adams et al. | 257/417 |
| 5,325,116 | A | 6/1994 | Sampsell | 346/108 |
| 5,327,286 | A | 7/1994 | Sampsell et al. | 359/561 |
| 5,329,289 | A | 7/1994 | Sakamoto et al. | 345/126 |
| 5,330,301 | A | 7/1994 | Brancher | 414/417 |
| 5,330,878 | A | 7/1994 | Nelson | 430/311 |
| 5,331,454 | A | 7/1994 | Hornbeck | 359/224 |
| 5,334,991 | A | 8/1994 | Wells et al. | 345/8 |
| 5,339,116 | A | 8/1994 | Urbanus et al. | 348/716 |
| 5,339,177 | A | 8/1994 | Jenkins et al. | 359/35 |
| 5,340,772 | A | 8/1994 | Rosotker | 437/226 |
| 5,345,521 | A | 9/1994 | McDonald et al. | 385/19 |
| 5,347,321 | A | 9/1994 | Gove | 348/663 |
| 5,347,378 | A | 9/1994 | Handschy et al. | 359/53 |
| 5,347,433 | A | 9/1994 | Sedlmayr | 362/32 |
| 5,348,619 | A | 9/1994 | Bohannon et al. | 156/664 |
| 5,349,687 | A | 9/1994 | Ehlig et al. | 395/800 |

| Patent | Date | Inventor | Class |
|---|---|---|---|
| 5,351,052 A | 9/1994 | D'Hont et al | 342/42 |
| 5,352,926 A | 10/1994 | Andrews | 257/717 |
| 5,354,416 A | 10/1994 | Okudaira | 156/643 |
| 5,357,369 A | 10/1994 | Pilling et al. | 359/462 |
| 5,357,803 A | 10/1994 | Lane | 73/517 B |
| 5,359,349 A | 10/1994 | Jambor et al. | 345/168 |
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,371,543 A | 12/1994 | Anderson | 348/270 |
| 5,371,618 A | 12/1994 | Tai et al. | 359/53 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |

| | | | | | | | |
|---|---|---|---|---|---|---|---|
| 5,544,306 | A | | 8/1996 | Deering et al. | ............. | 395/164 |
| 5,552,635 | A | * | 9/1996 | Kim et al. | .................. | 257/706 |
| 5,554,304 | A | | 9/1996 | Suzuki | ........................ | 216/2 |
| 5,576,878 | A | | 11/1996 | Henck | ........................ | 359/224 |
| 5,602,671 | A | | 2/1997 | Hornbeck | .................. | 359/224 |
| 5,606,181 | A | | 2/1997 | Sakuma et al. | ............... | 257/88 |
| 5,606,447 | A | | 2/1997 | Asada et al. | ................ | 359/199 |
| 5,610,438 | A | | 3/1997 | Wallace et al. | ............. | 257/682 |
| 5,623,361 | A | | 4/1997 | Engle | ........................ | 359/291 |
| 5,629,566 | A | | 5/1997 | Doi et al. | .................. | 257/789 |
| 5,640,216 | A | | 6/1997 | Hasegawa et al. | ............ | 349/58 |
| 5,658,698 | A | | 8/1997 | Yagi et al. | ................... | 430/11 |
| 5,661,593 | A | | 8/1997 | Engle | ........................ | 359/292 |
| 5,663,817 | A | | 9/1997 | Frapin et al. | ................. | 349/5 |
| 5,668,611 | A | | 9/1997 | Ernstoff et al. | ............. | 348/771 |
| 5,673,139 | A | | 9/1997 | Johnson | ..................... | 359/291 |
| 5,677,783 | A | | 10/1997 | Bloom et al. | ................ | 359/224 |
| 5,689,361 | A | | 11/1997 | Damen et al. | ............. | 359/284 |
| 5,694,740 | A | | 12/1997 | Martin et al. | ................ | 53/431 |
| 5,696,560 | A | | 12/1997 | Songer | ....................... | 348/436 |
| 5,699,740 | A | | 12/1997 | Gelbart | ....................... | 101/477 |
| 5,704,700 | A | | 1/1998 | Kappel et al. | ................ | 353/31 |
| 5,707,160 | A | | 1/1998 | Bowen | ....................... | 400/472 |
| 5,712,649 | A | | 1/1998 | Tosaki | ........................ | 345/8 |
| 5,713,652 | A | | 2/1998 | Zavracky et al. | ........... | 353/122 |
| 5,726,480 | A | | 3/1998 | Pister | ......................... | 257/415 |
| 5,731,802 | A | | 3/1998 | Aras et al. | ................... | 345/148 |
| 5,734,224 | A | | 3/1998 | Tagawa et al. | ............. | 313/493 |
| 5,742,373 | A | | 4/1998 | Alvelda | ...................... | 349/204 |
| 5,744,752 | A | | 4/1998 | McHerron et al. | ......... | 174/52.4 |
| 5,745,271 | A | | 4/1998 | Ford et al. | ................... | 359/130 |
| 5,757,354 | A | | 5/1998 | Kawamura | .................. | 345/126 |
| 5,764,280 | A | | 6/1998 | Bloom et al. | ............... | 348/53 |
| 5,768,009 | A | | 6/1998 | Little | ........................ | 359/293 |
| 5,773,473 | A | | 6/1998 | Green et al. | ................ | 438/26 |
| 5,793,519 | A | | 8/1998 | Furlani et al. | .............. | 359/291 |
| 5,798,743 | A | | 8/1998 | Bloom | ........................ | 345/90 |
| 5,798,805 | A | | 8/1998 | Ooi et al. | ................... | 349/10 |
| 5,801,074 | A | | 9/1998 | Kim et al. | .................. | 438/125 |
| 5,802,222 | A | | 9/1998 | Rasch et al. | ................. | 385/1 |
| 5,808,323 | A | | 9/1998 | Spaeth et al. | ................ | 257/88 |
| 5,815,126 | A | | 9/1998 | Fan et al. | ...................... | 345/8 |
| 5,825,443 | A | | 10/1998 | Kawasaki et al. | ............ | 349/95 |
| 5,832,148 | A | * | 11/1998 | Yariv | ........................ | 385/16 |
| 5,835,255 | A | | 11/1998 | Miles | ........................ | 359/291 |
| 5,835,256 | A | | 11/1998 | Huibers | ...................... | 359/291 |
| 5,837,562 | A | | 11/1998 | Cho | ........................... | 438/51 |
| 5,841,929 | A | * | 11/1998 | Komatsu et al. | ............ | 385/129 |
| 5,844,711 | A | * | 12/1998 | Long, Jr. | ..................... | 359/291 |
| 5,847,859 | A | * | 12/1998 | Murata | ........................ | 359/201 |
| 5,862,164 | A | | 1/1999 | Hill | ............................. | 372/27 |
| 5,868,854 | A | | 2/1999 | Kojima et al. | ................ | 134/1.3 |
| 5,886,675 | A | | 3/1999 | Aye et al. | ....................... | 345/7 |
| 5,892,505 | A | | 4/1999 | Tropper | ...................... | 345/208 |
| 5,895,233 | A | | 4/1999 | Higashi et al. | ............. | 438/107 |
| 5,898,515 | A | | 4/1999 | Furlani et al. | .............. | 359/290 |
| 5,903,243 | A | | 5/1999 | Jones | .......................... | 345/7 |
| 5,903,395 | A | | 5/1999 | Rallison et al. | .............. | 359/630 |
| 5,910,856 | A | | 6/1999 | Ghosh et al. | ............... | 359/291 |
| 5,912,094 | A | | 6/1999 | Aksyuk et al. | .............. | 430/5 |
| 5,912,608 | A | | 6/1999 | Asada | ........................ | 335/222 |
| 5,914,801 | A | | 6/1999 | Dhuler et al. | ............... | 359/230 |
| 5,915,168 | A | | 6/1999 | Salatino et al. | ............. | 438/110 |
| 5,919,548 | A | * | 7/1999 | Barron et al. | ................ | 428/138 |
| 5,920,411 | A | | 7/1999 | Duck et al. | ................... | 359/127 |
| 5,920,418 | A | | 7/1999 | Shiono et al. | ............... | 359/246 |
| 5,923,475 | A | | 7/1999 | Kurtz et al. | ................. | 359/619 |
| 5,926,318 | A | | 7/1999 | Hebert | ....................... | 359/618 |
| 5,942,791 | A | | 8/1999 | Shorrocks et al. | .......... | 257/522 |
| 5,949,390 | A | | 9/1999 | Nomura et al. | ............. | 345/32 |
| 5,953,161 | A | | 9/1999 | Troxell et al. | ............... | 359/618 |
| 5,955,771 | A | | 9/1999 | Kurtz et al. | ................. | 257/419 |
| 5,963,788 | A | | 10/1999 | Barron et al. | ................. | 438/48 |
| 5,978,127 | A | | 11/1999 | Berg | ........................ | 359/279 |
| 5,986,634 | A | | 11/1999 | Alioshin | ..................... | 345/126 |
| 5,995,303 | A | | 11/1999 | Honguh et al. | ............. | 359/708 |
| 5,999,319 | A | * | 12/1999 | Castracane | .................. | 359/572 |
| 6,004,912 | A | | 12/1999 | Gudeman | .................... | 508/577 |
| 6,012,336 | A | * | 1/2000 | Eaton et al. | .................. | 73/754 |
| 6,016,222 | A | | 1/2000 | Setani et al. | ................. | 359/571 |
| 6,025,859 | A | | 2/2000 | Ide et al. | .................... | 347/135 |
| 6,038,057 | A | | 3/2000 | Brazas, Jr. et al. | ......... | 359/291 |
| 6,040,748 | A | | 3/2000 | Gueissaz | ..................... | 335/78 |
| 6,046,840 | A | | 4/2000 | Huibers | ...................... | 359/291 |
| 6,055,090 | A | | 4/2000 | Miles | ......................... | 359/291 |
| 6,057,520 | A | | 5/2000 | Goodwin-Johansson | .... | 200/181 |
| 6,061,489 | A | | 5/2000 | Ezra | ............................ | 385/115 |
| 6,062,461 | A | | 5/2000 | Sparks et al. | ............. | 228/123.1 |
| 6,064,404 | A | | 5/2000 | Aras et al. | ................... | 345/507 |
| 6,069,392 | A | * | 5/2000 | Tai et al. | .................... | 257/419 |
| 6,071,652 | A | * | 6/2000 | Feldman et al. | ............... | 430/5 |
| 6,075,632 | A | | 6/2000 | Braun | ......................... | 359/124 |
| 6,084,626 | A | | 7/2000 | Ramanujan et al. | ........ | 347/239 |
| 6,088,102 | A | | 7/2000 | Manhart | ..................... | 356/354 |
| 6,090,717 | A | | 7/2000 | Powell et al. | ............... | 438/710 |
| 6,091,521 | A | | 7/2000 | Popovich | ..................... | 359/15 |
| 6,096,576 | A | | 8/2000 | Corbin et al. | ............... | 438/108 |
| 6,096,656 | A | * | 8/2000 | Matzke et al. | .............. | 438/702 |
| 6,097,352 | A | | 8/2000 | Zavracky et al. | .............. | 345/7 |
| 6,101,036 | A | | 8/2000 | Bloom | ........................ | 359/567 |
| 6,115,168 | A | | 9/2000 | Zhao et al. | ................... | 359/247 |
| 6,122,299 | A | | 9/2000 | DeMars et al. | ................ | 372/20 |
| 6,123,985 | A | * | 9/2000 | Robinson et al. | ............ | 427/162 |
| 6,124,145 | A | | 9/2000 | Stemme et al. | ................ | 438/26 |
| 6,130,770 | A | | 10/2000 | Bloom | ........................ | 359/224 |
| 6,144,481 | A | | 11/2000 | Kowarz et al. | ............. | 359/291 |
| 6,147,789 | A | | 11/2000 | Gelbart | ....................... | 359/231 |
| 6,154,259 | A | | 11/2000 | Hargis et al. | ................. | 348/756 |
| 6,154,305 | A | | 11/2000 | Dickensheets et al. | | |
| 6,163,026 | A | | 12/2000 | Bawolek et al. | ............. | 250/351 |
| 6,163,402 | A | | 12/2000 | Chou et al. | ................... | 359/443 |
| 6,172,797 | B1 | | 1/2001 | Huibers | ...................... | 359/291 |
| 6,177,980 | B1 | | 1/2001 | Johnson | ....................... | 355/67 |
| 6,197,610 | B1 | | 3/2001 | Toda | ............................ | 438/50 |
| 6,210,988 | B1 | | 4/2001 | Howe et al. | .................. | 438/50 |
| 6,222,954 | B1 | | 4/2001 | Riza | ............................. | 385/18 |
| 6,229,683 | B1 | | 5/2001 | Goodwin-Johansson | .... | 361/233 |
| 6,241,143 | B1 | | 6/2001 | Kuroda | ...................... | 228/110.1 |
| 6,249,381 | B1 | * | 6/2001 | Suganuma | .................. | 359/618 |
| 6,251,842 | B1 | | 6/2001 | Gudeman | .................... | 508/577 |
| 6,252,697 | B1 | * | 6/2001 | Hawkins et al. | ............. | 359/290 |
| 6,254,792 | B1 | | 7/2001 | Van Buskirk et al. | ......... | 216/13 |
| 6,261,494 | B1 | | 7/2001 | Zavracky et al. | ............ | 264/104 |
| 6,268,952 | B1 | * | 7/2001 | Godil et al. | ................... | 359/247 |
| 6,271,145 | B1 | | 8/2001 | Toda | ........................... | 438/706 |
| 6,271,808 | B1 | | 8/2001 | Corbin | ............................ | 345/7 |
| 6,274,469 | B1 | | 8/2001 | Yu | .............................. | 438/592 |
| 6,282,213 | B1 | * | 8/2001 | Gutin et al. | ..................... | 372/20 |
| 6,290,859 | B1 | | 9/2001 | Fleming et al. | ................ | 216/2 |
| 6,290,864 | B1 | | 9/2001 | Patel et al. | .................... | 216/79 |
| 6,300,148 | B1 | | 10/2001 | Birdsley et al. | ............... | 438/15 |
| 6,303,986 | B1 | | 10/2001 | Shook | ........................ | 257/680 |
| 6,310,018 | B1 | | 10/2001 | Behr et al. | ................... | 510/175 |
| 6,313,901 | B1 | * | 11/2001 | Cacharelis | .................. | 349/187 |
| 6,323,984 | B1 | | 11/2001 | Trisnadi | ...................... | 359/245 |
| 6,327,071 | B1 | | 12/2001 | Kimura | ....................... | 359/291 |
| 6,342,960 | B1 | | 1/2002 | McCullough | ............... | 359/124 |
| 6,346,430 | B1 | * | 2/2002 | Raj et al. | ........................ | 438/64 |
| 6,356,577 | B1 | | 3/2002 | Miller | ......................... | 372/107 |
| 6,356,689 | B1 | | 3/2002 | Greywall | ..................... | 385/52 |
| 6,359,333 | B1 | | 3/2002 | Wood et al. | .................. | 257/704 |
| 6,384,959 | B1 | | 5/2002 | Furlani et al. | ............... | 359/291 |

| | | | |
|---|---|---|---|
| 6,387,723 B1 | 5/2002 | Payne et al. | 438/48 |
| 6,392,309 B1 | 5/2002 | Wataya et al. | 257/796 |
| 6,396,789 B1 * | 5/2002 | Guerra et al. | 369/112.01 |
| 6,418,152 B1 * | 7/2002 | Davis | 372/18 |
| 6,421,179 B1 | 7/2002 | Gutin et al. | 359/572 |
| 6,438,954 B1 | 8/2002 | Goetz et al. | |
| 6,445,502 B1 * | 9/2002 | Islam et al. | 359/290 |
| 6,452,260 B1 | 9/2002 | Corbin et al. | 257/686 |
| 6,466,354 B1 | 10/2002 | Gudeman | 359/247 |
| 6,479,811 B1 * | 11/2002 | Kruschwitz et al. | 250/237 G |
| 6,480,634 B1 | 11/2002 | Corrigan | 385/4 |
| 6,497,490 B1 | 12/2002 | Miller et al. | 359/614 |
| 6,525,863 B1 | 2/2003 | Riza | 359/290 |
| 6,563,974 B2 | 5/2003 | Agha Riza | 385/18 |
| 6,565,222 B1 | 5/2003 | Ishii et al. | 359/883 |
| 6,569,717 B1 * | 5/2003 | Murade | 438/149 |
| 2001/0019454 A1 | 9/2001 | Tadic-Galeb et al. | 359/649 |
| 2002/0015230 A1 * | 2/2002 | Pilossof et al. | 359/558 |
| 2002/0021295 A1 * | 2/2002 | Pilossof | 359/295 |
| 2002/0079432 A1 * | 6/2002 | Lee et al. | 250/216 |
| 2002/0105725 A1 * | 8/2002 | Sweatt et al. | 359/566 |
| 2002/0112746 A1 | 8/2002 | De Young et al. | 134/36 |
| 2002/0131228 A1 * | 9/2002 | Potter | 361/233 |
| 2002/0131230 A1 | 9/2002 | Potter | 361/277 |
| 2002/0135708 A1 * | 9/2002 | Murden et al. | 349/19 |
| 2002/0176151 A1 * | 11/2002 | Moon et al. | 359/298 |
| 2002/0195418 A1 * | 12/2002 | Kowarz et al. | 216/13 |
| 2002/0196492 A1 * | 12/2002 | Trisnadi et al. | 359/124 |
| 2003/0056078 A1 * | 3/2003 | Johansson et al. | 711/200 |

FOREIGN PATENT DOCUMENTS

| | | | | |
|---|---|---|---|---|
| DE | 197 51 716 A1 | 5/1998 | | G02B/27/14 |
| DE | 198 46 532 C1 | 5/2000 | | G02B/27/09 |
| EP | 0 089 044 A2 | 9/1983 | | H01L/23/10 |
| EP | 0 261 901 A2 | 3/1988 | | G09G/3/36 |
| EP | 0 314 437 A1 | 10/1988 | | H01L/25/08 |
| EP | 0 304 263 A2 | 2/1989 | | H01L/25/065 |
| EP | 0 306 308 A2 | 3/1989 | | H04N/3/14 |
| EP | 0 322 714 A2 | 7/1989 | | G02B/5/30 |
| EP | 0 627 644 A3 | 9/1990 | | G02B/27/00 |
| EP | 0 417 039 A1 | 3/1991 | | G03B/21/20 |
| EP | 0 423 513 A2 | 4/1991 | | H01S/3/085 |
| EP | 0 436 738 A1 | 7/1991 | | H04N/5/74 |
| EP | 0 458 316 A2 | 11/1991 | | G06K/11/06 |
| EP | 0 477 566 A2 | 4/1992 | | G02B/26/08 |
| EP | 0 488 326 A3 | 6/1992 | | G09G/3/28 |
| EP | 0 499 566 A2 | 8/1992 | | G06F/3/033 |
| EP | 0 528 646 A1 | 2/1993 | | G09G/3/02 |
| EP | 0 530 760 A2 | 3/1993 | | G09G/3/34 |
| EP | 0 550 189 A1 | 7/1993 | | G02F/1/315 |
| EP | 0 610 665 A1 | 8/1994 | | G09G/3/34 |
| EP | 0 627 644 A2 | 12/1994 | | G02B/27/00 |
| EP | 0 627 850 A1 | 12/1994 | | H04N/5/64 |
| EP | 0 643 314 A2 | 3/1995 | | G02B/27/00 |
| EP | 0 654 777 A1 | 5/1995 | | G09G/3/34 |
| EP | 0 658 868 A1 | 6/1995 | | G09G/3/34 |
| EP | 0 658 830 A1 | 12/1995 | | G09G/3/34 |
| EP | 0 689 078 A1 | 12/1995 | | G02B/26/08 |
| EP | 0 801 319 A1 | 10/1997 | | G02B/26/00 |
| EP | 0 851 492 A2 | 7/1998 | | H01L/23/528 |
| EP | 1 003 071 A2 | 5/2000 | | G03B/27/72 |
| EP | 1 014 143 A1 | 6/2000 | | G02B/26/08 |
| EP | 1 040 927 A2 | 10/2000 | | B41J/2/455 |
| GB | 2 117 564 A | 10/1983 | | H01L/25/08 |
| GB | 2 118 365 A | 10/1983 | | H01L/27/13 |
| GB | 2 266 385 A | 10/1993 | | G02B/23/10 |
| GB | 2 296 152 A | 6/1996 | | H04N/13/04 |
| GB | 2 319 424 A | 5/1998 | | H04N/13/04 |
| JP | 53-39068 | 4/1978 | | H01L/23/12 |
| JP | 55-111151 | 8/1980 | | H01L/27/00 |
| JP | 57-31166 | 2/1982 | | H01L/23/48 |
| JP | 57-210638 | 12/1982 | | H01L/21/60 |
| JP | 60-49638 | 3/1985 | | H01L/21/60 |
| JP | 60-94756 | 5/1985 | | H01L/25/04 |
| JP | 60-250639 | 12/1985 | | H01L/21/58 |
| JP | 61-142750 | 6/1986 | | H01L/21/60 |
| JP | 61-145838 | 7/1986 | | H01L/21/60 |
| JP | 63-234767 | 9/1988 | | H04N/1/04 |
| JP | 63-305323 | 12/1988 | | G02F/1/13 |
| JP | 1-155637 | 6/1989 | | H01L/21/66 |
| JP | 40-1155637 | 6/1989 | | H01L/21/92 |
| JP | 2219092 | 8/1990 | | G09G/3/28 |
| JP | 4-333015 | 11/1992 | | G02B/27/18 |
| JP | 7-281161 | 10/1995 | | G02F/1/1333 |
| JP | 3288369 | 3/2002 | | G02B/26/06 |
| WO | WO 90/13913 | 11/1990 | | H01L/23/10 |
| WO | WO 92/12506 | 7/1992 | | G09F/9/37 |
| WO | WO 93/02269 | 2/1993 | | E06B/5/10 |
| WO | WO 93/09472 | 5/1993 | | G03F/7/20 |
| WO | WO 93/18428 | 9/1993 | | G02B/27/00 |
| WO | WO 93/22694 | 11/1993 | | G02B/5/18 |
| WO | WO 94/09473 | 4/1994 | | G09G/3/34 |
| WO | WO 94/29761 | 12/1994 | | G02B/27/24 |
| WO | WO 95/11473 | 4/1995 | | G02B/27/00 |
| WO | WO 96/02941 | 2/1996 | | H01L/23/02 |
| WO | WO 96/41217 | 12/1996 | | G02B/5/18 |
| WO | WO 96/41224 | 12/1996 | | G02B/19/00 |
| WO | WO 97/22033 | 6/1997 | | G02B/27/22 |
| WO | WO 97/26569 | 7/1997 | | G02B/5/18 |
| WO | WO 98/05935 | 2/1998 | | G01L/9/06 |
| WO | WO 98/24240 | 6/1998 | | H04N/9/31 |
| WO | WO 98/41893 | 9/1998 | | G02B/26/08 |
| WO | WO 99/07146 | 2/1999 | | H04N/7/16 |
| WO | WO 99/12208 | 3/1999 | | H01L/25/065 |
| WO | WO 99/23520 | 5/1999 | | G02B/26/08 |
| WO | WO 99/34484 | 7/1999 | | |
| WO | WO 99/59335 | 11/1999 | | H04N/5/765 |
| WO | WO 99/63388 | 12/1999 | | G02B/27/22 |
| WO | WO 00/04718 | 1/2000 | | H04N/7/167 |
| WO | WO 00/07225 | 2/2000 | | H01L/21/00 |
| WO | WO 01/04674 A1 | 1/2001 | | G02B/6/12 |
| WO | WO 01/006297 A3 | 1/2001 | | G02B/27/10 |
| WO | WO 01/57581 A3 | 8/2001 | | G02B/27/48 |
| WO | WO 02/025348 A3 | 3/2002 | | G02B/26/02 |
| WO | WO 02/31575 A2 | 4/2002 | | G02B/27/00 |
| WO | WO 02/058111 A2 | 7/2002 | | |
| WO | WO 02/065184 A3 | 8/2002 | | G02B/27/12 |
| WO | WO 02/073286 A2 | 9/2002 | | G02B/26/08 |
| WO | WO 02/084375 A1 | 10/2002 | | G02B/26/08 |
| WO | WO 02/084397 A3 | 10/2002 | | G02B/27/18 |
| WO | WO 03/001281 A1 | 1/2003 | | G02F/1/01 |
| WO | WO 03/001716 A1 | 1/2003 | | H04J/14/02 |
| WO | WO 03/012523 A1 | 2/2003 | | G02B/26/00 |
| WO | WO 03/016965 A1 | 2/2003 | | G02B/5/18 |
| WO | WO 03/023849 A1 | 3/2003 | | H01L/23/02 |
| WO | WO 03/025628 A2 | 3/2003 | | |

OTHER PUBLICATIONS

NASA's Jet Propulsion Laboratory, "Micromachined Opto/Electro/Mechanical Systems,", NASA Tech Briefs, Mar. 1997, pp. 50–51.*

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

P. Alvelda, "High-Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Esses, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," NIT, pp. 1–93, 1995.

P. Alvelda, "VLSI Microdisplay Technology," Oct. 14, 1994.

D.P. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Extraction of Solvent from Micromachined Structures," Supercritical Fluids, Chapter 18, American Chemical Society, pp. 255–269, 1997.

Buhler et al., "Linear Array of Complementary Metal Oxide Semiconductor Double–Pass Metal Micromirrors," Optical Engineering, vol. 36, No. 5, pp. 1391–1398, May 1997.

Gani et al., "Variable Gratings for Optical Switching: Rigorous Electromagnetic Simulation and Design," Optical Engineering, vol. 38, No. 3, pp. 552–557, Mar. 1999.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellete Grating and its Application to Tunable Laser Resonator," Electronics and Communications in Japan, vol. 63–c, No. 10, pp. 94–100, Japan, 1980.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997. pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal of Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

S.T. Pai, et al., "Electromigration in Metals", Received Jun. 4, 1976, pg. 103–115.

Olga B. Spahn, et al., "High Optical Power Handling of Pop–Up Microelectromechanical Mirrors", Sandia National Laboratories, IEEE 2000, pg. 51–52.

David M. Burns, et al. "Optical Power Induced Damage to Microelectromechanical Mirrors", Sensors and Actuators A 70, 1998, pg. 6–14.

V.S. Aliev et al., "Development of Si(100) surface roughness at the initial stage of etching in F2 and XeF2 gases: ellipsometric study," Surface Science 442 (1999), pgs. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold Winters, "Etch products from the reaction of XeF2 with SiO2, Si3N4, SiC, and Si in the presence of Ion Bombardment," IBM Watch Laboratory, 1983 American Vacuum Society pgs. 927–931.

F. A. Houle, "Dynamics of SiF4 desorption during etching of silicon by XeF2," J. Chem. Phys. 87 (3), Aug. 1, 1987, pgs. 1866–1872.

Mehran Mehregany, "Microelectromechanical Systems," 1993 IEEE, pgs. 14–22.

D. Moser et al., "A CMOS Compatible Thermally Excited Silicon Oxide Beam Resonator with Aluminium Mirror," Physical Electronics Laboratory, 1991 IEEE, pgs. 547–550.

M. Parameswaran et al., "Commerical CMOS Fabricated Integrated Dynamic Thermal Scene Simulator," 1991 IEEE, pgs. 29.4.1–29.4.4.

M. Parameswaran et al., "CMOS Electrothermal Microactuators," Depart. of Electrical Engineering, 1990 IEEE, pgs. 128–131.

U. Streller et al., "Selectivity in dry etching of Si(100) with XeF2 and VUV light," Applied Surface Science 106, (1996), pgs. 341–346.

M.J.M. Vugts et al., "Si/XeF2 etching: Temperature dependence," 1996 American Vacuum Society, pgs. 2766–2774.

P. Krummenacher et al., "Smart Temperature Sensor in CMOS Technology," Sensors and Actuators, A–21–A–23 (1990), pgs. 636–638.

Henry Baltes, "CMOS as sensor technology," Sensors and Actuators A. 37–38, (1993), pgs. 51–56.

Thomas Boltshauser et al., "Piezoresistive Membrane Hygrometers Based on IC Technology," Sensor and Materials, 5, 3, (1993), pgs. 125–134.

Jon Gildemeister, "Xenon Difluoride Etching System" 1997, UC Berkeley MicroTabrication Manual Chapter 7.15, pg. 2–5.

W. Riethmuller et al., "A smart accelerometer with on–chip electronics fabricated by a commercial CMSO process," Sensors and Actuators A. 31, (1992), 121–124.

D. E. Ibbotson et al., "Comparison of XeF2 and F–atom reations with Si and SiO2," 1984 American Institute of Physics, pgs. 1129–1131.

D. E. Ibbotson et al., "Plasmaless dry etching of silicon with fluorine–containing compounds," 1984 American Institute of Physics, pgs. 2939–2942.

M.H. Hecht et al., "A novel x–ray photoelectron spectroscopy study of the Al/SiO2 interfaces," 1985 American Institute of Physics, pgs. 5256–52616.

Daniel L. Flamm et al., "XeF2 and F–Atom Reactions with Si: Their Significance for Plasma Etching," Solid State Technolgy, V. 26, #4, 4/83, pgs. 117–121.

H.F. Winters et al., "The etching of silicon with XeF2 vapor," Appl. Phys. Lett. vol. 34, No. 1, Jan. 1979, pgs. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, (13 pgs.) pp. 117–128.

J. Marshall et al., "Realizing Suspended Structures on Chips Fabricated by CMOS Foundry Processes Through the MOSIS Service," National Inst. of Standards and Technology, Jun. 94, 63 pgs.

David Moser et al., "CMOS Flow Sensors," 1993 Physical Electronics Lab, Swiss Federal Institute of Tech. Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P.C. Kundu et al., "Reduction of Speckle Noise by Varying the Polarisation of Illuminating Beam", XP–0021283475, Dept. of Applied Physics, Calcutta University, 1975, pp. 63–67.

J.W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R. W. Corrigan et al., "Calibration of a Scanned Linear Grating Light–Valve, Projection System for E–Cinema Applications", Silicon Light Machines, SID'99, San Jose, CA, 27 pgs, 1999.

R. W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Mircomirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Appplications", IEEE Protonics Technology Letters, vol. 6, No. 9, Sep. 1994, pp. 1119–1121.

A. P. Payne et al., "Resonance Measurements of Stresses in Al/$Si_3N_4$ Micro–Ribbons", Silicon Light Machines, Sep. 22, 1999, 11 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

* cited by examiner

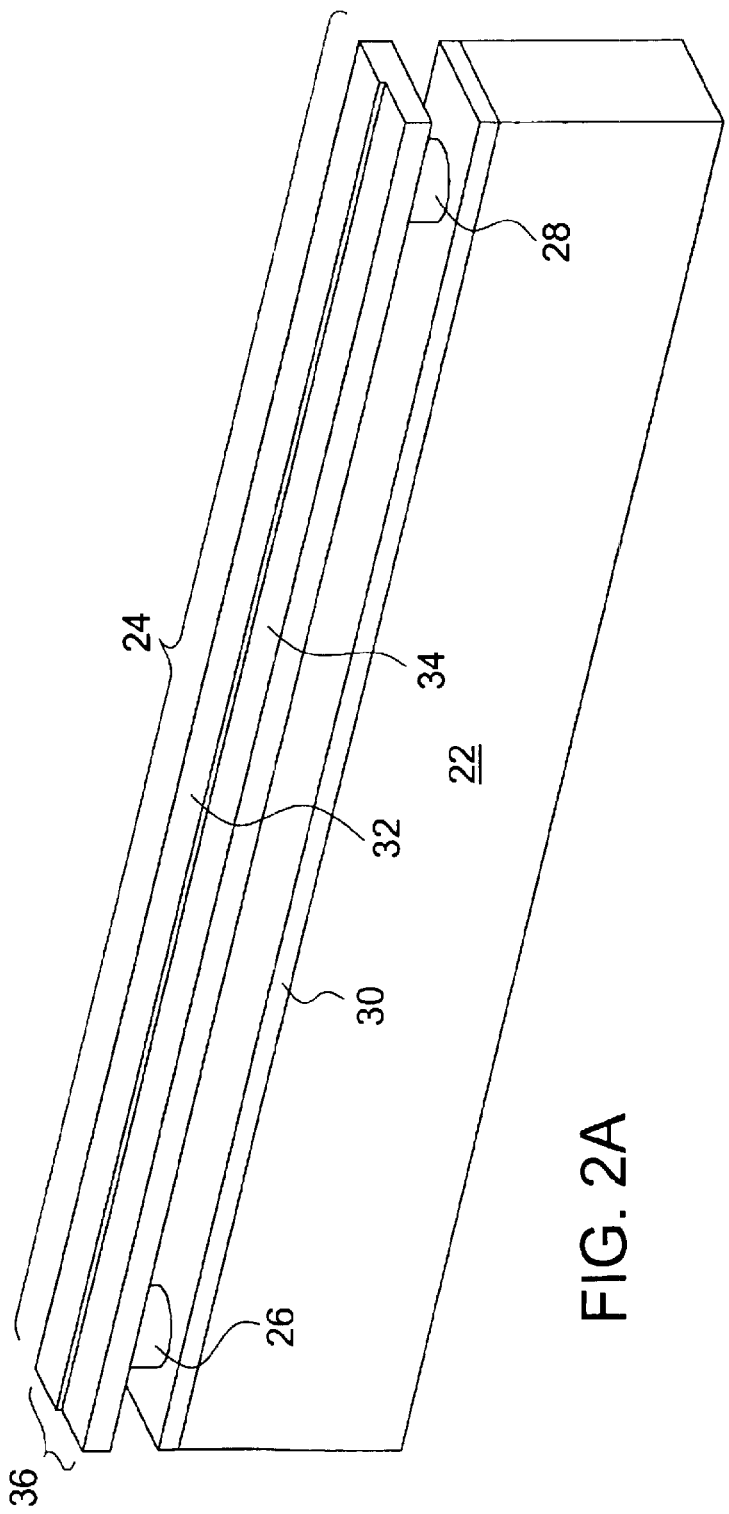
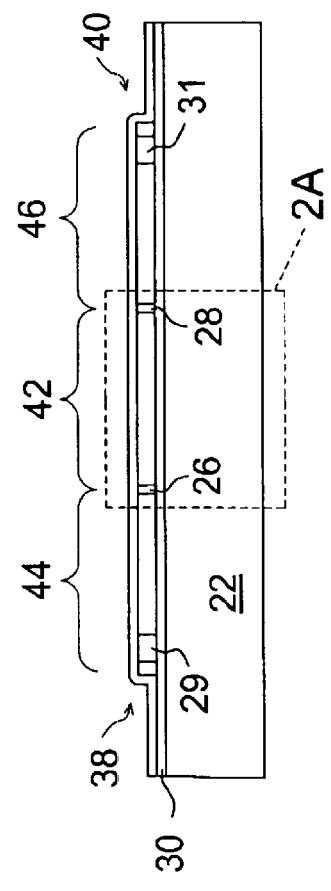
FIG. 2A
FIG. 2B

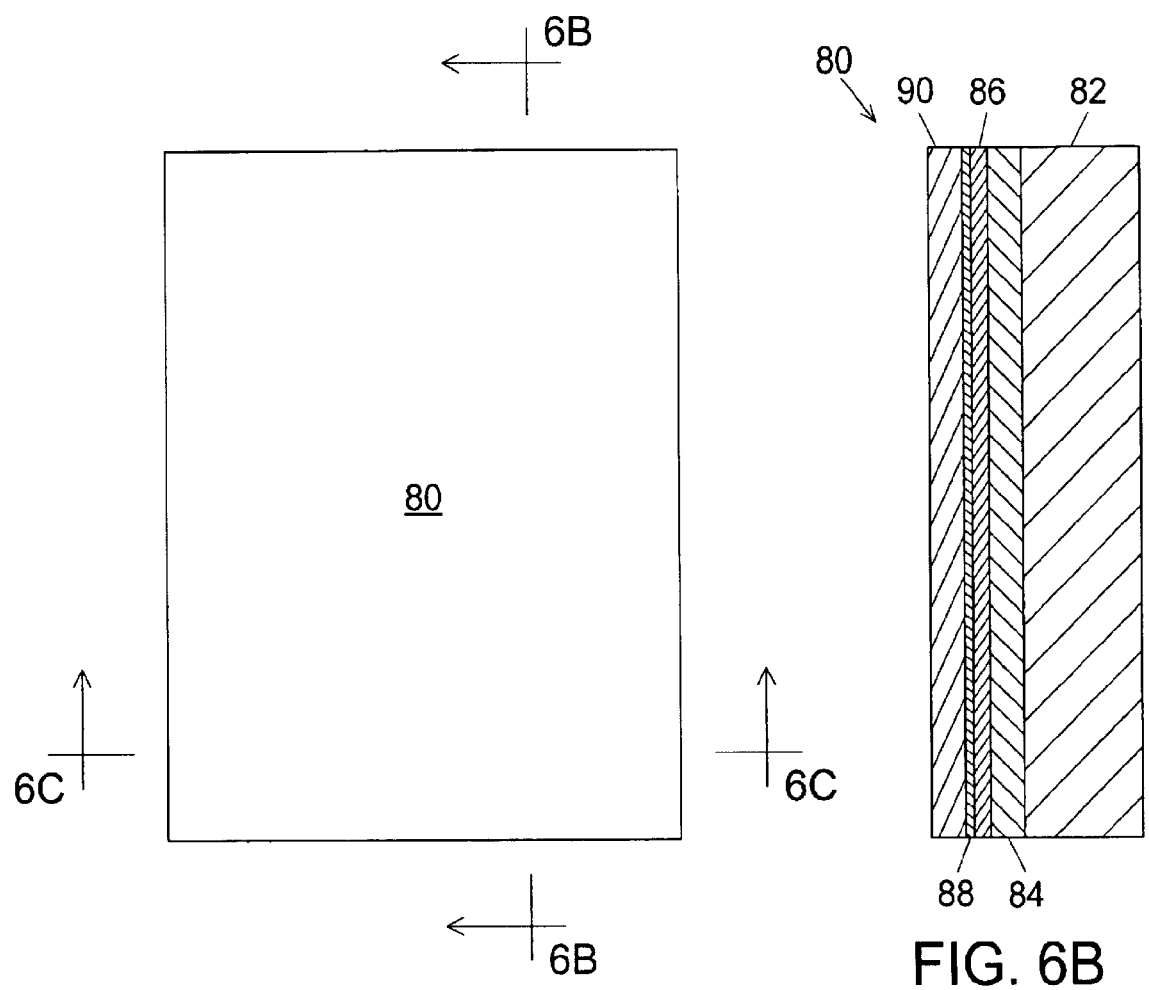
FIG. 6A
FIG. 6B
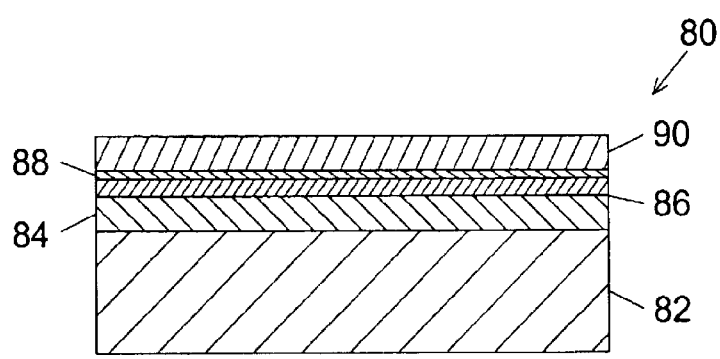
FIG. 6C

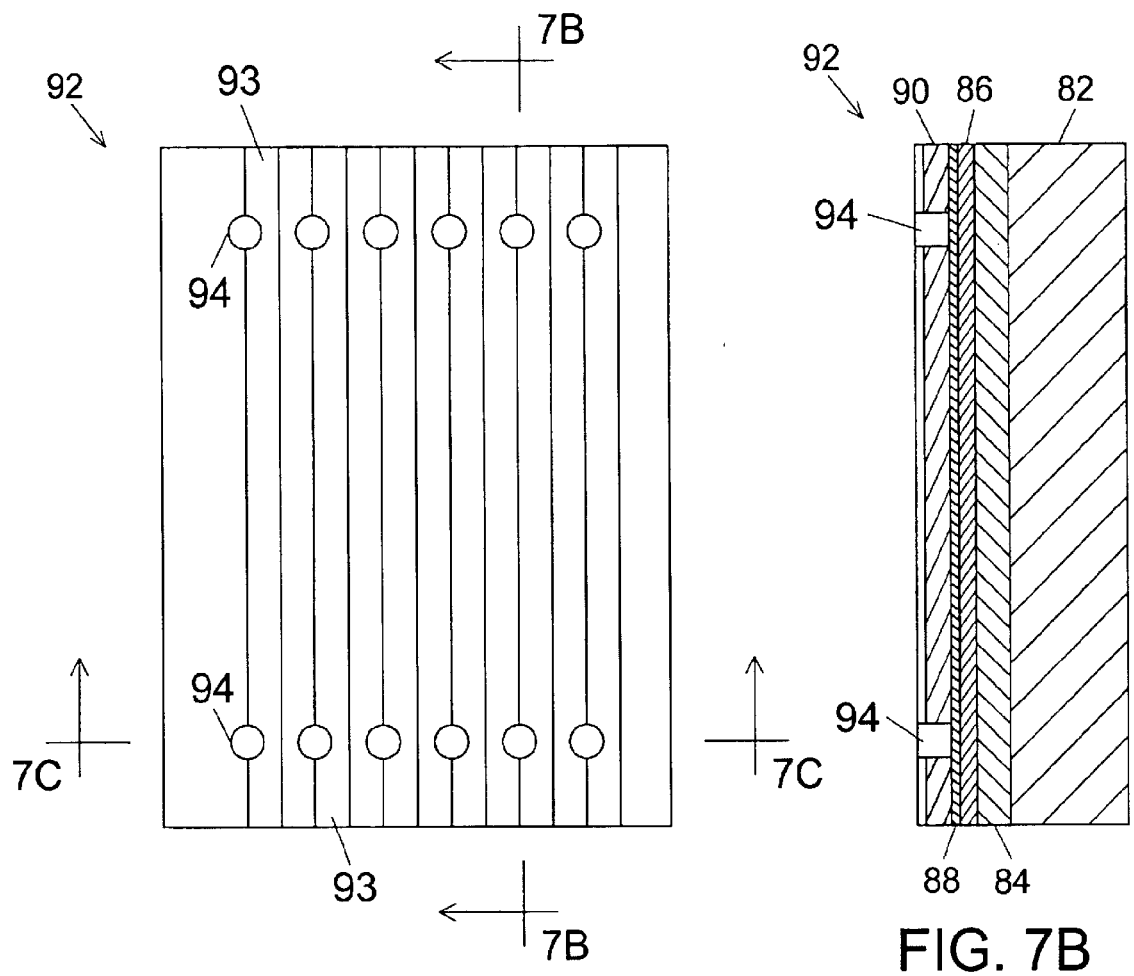
FIG. 7A
FIG. 7B
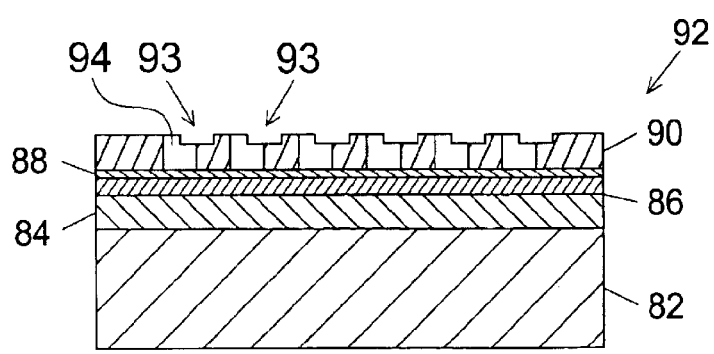
FIG. 7C

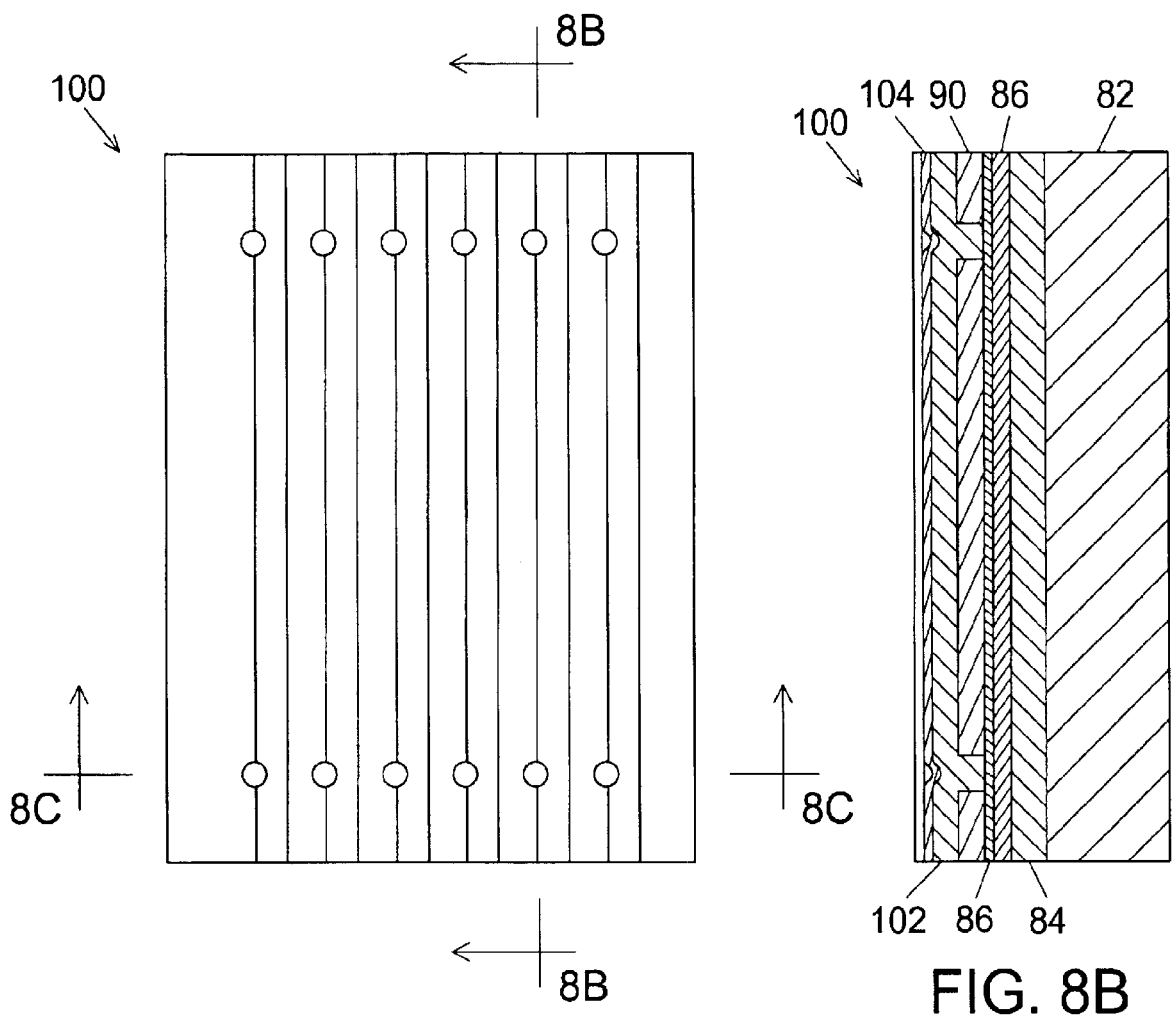
FIG. 8A
FIG. 8B
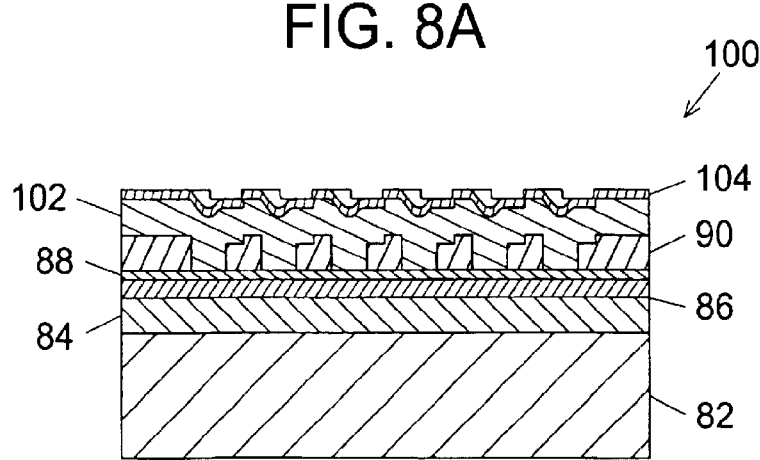
FIG. 8C

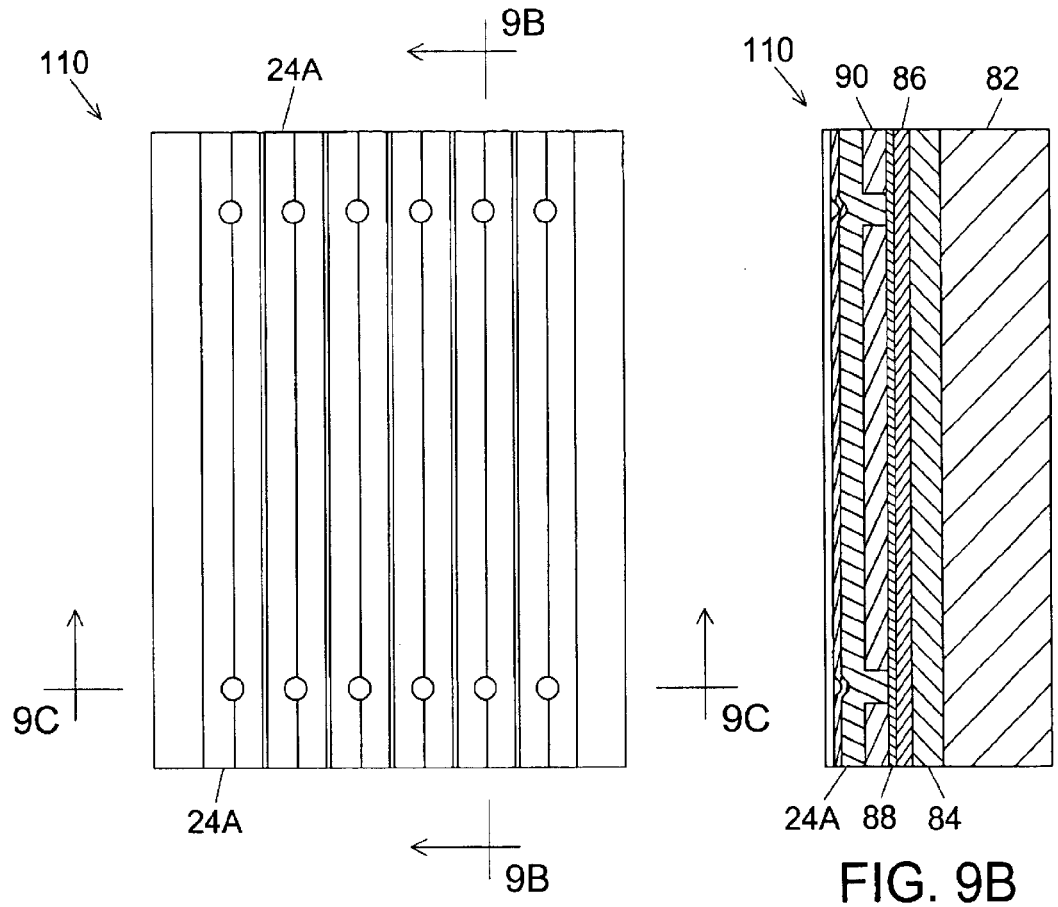
FIG. 9A
FIG. 9B
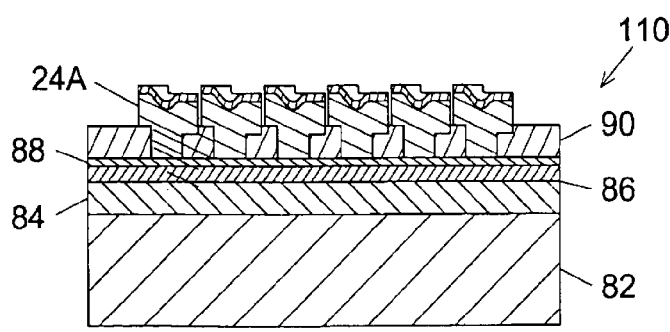
FIG. 9C

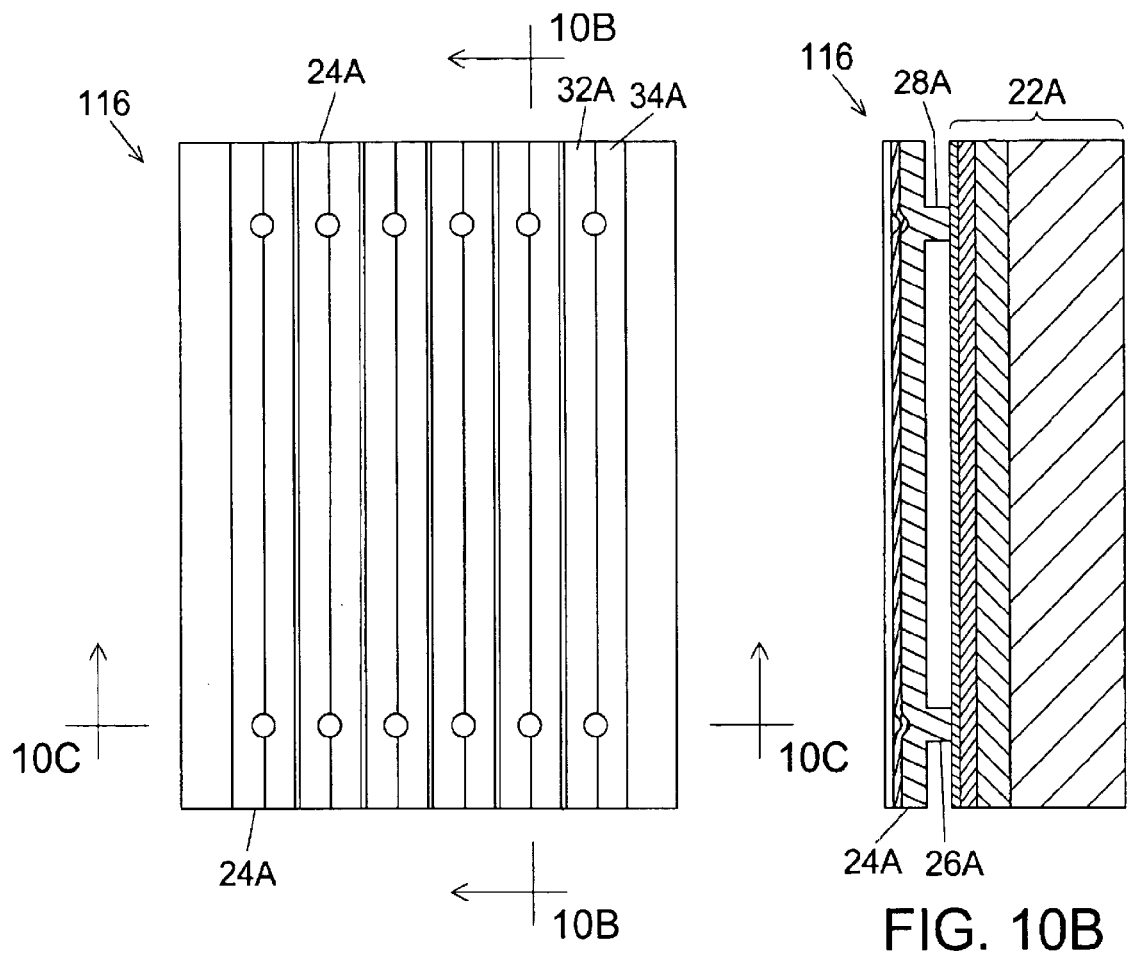
FIG. 10A
FIG. 10B
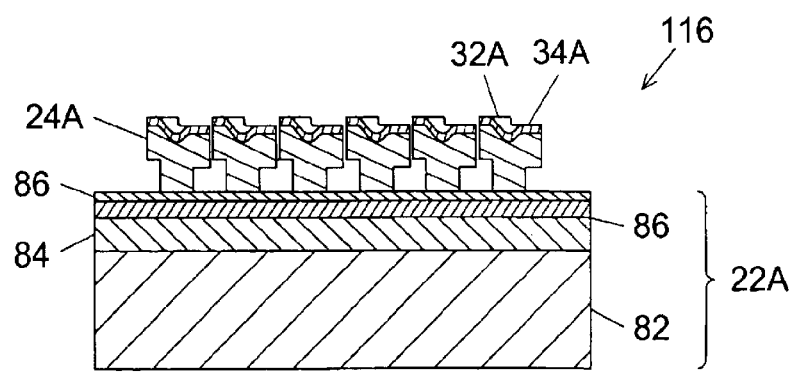
FIG. 10C

BLAZED GRATING LIGHT VALVE

FIELD OF THE INVENTION

This invention relates to the field of light modulators. More particularly, this invention relates to the field of light modulators where an incident light is modulated to produce a blazed diffraction.

BACKGROUND OF THE INVENTION

Bloom et al. in U.S. Pat. No. 5,311,360, entitled "Method and apparatus for modulating a light beam," teach a grating light valve which operates in a reflection mode and a diffraction mode. The grating light valve includes elongated elements suspended above a substrate. In the reflective mode, reflective surfaces of the grating light valve cause incident light to constructively combine to form reflected light. In the diffractive mode, the reflective surfaces of the grating light valve are separated by a quarter wavelength of the incident light to produce diffracted light. When the grating light valve is in the diffractive mode, the grating light valve predominantly diffracts light into a plus one diffraction order and a minus one diffraction order but also diffracts a small amount of light into higher diffraction orders.

Bloom et al. further teach an alternative grating light valve which operates in the reflection mode and in a blazed diffraction mode. The alternative grating light valve includes the elongated elements suspended above the substrate. For the alternative grating light valve, the elongated elements include off-axis neck portions at ends of each of the elongated elements. In the reflection mode, the elongated elements are parallel causing incident light to reflect from the elongated elements and, thus, produce the reflected light. In the blazed diffraction mode, each of the elongated elements is rotated about an axis defined by the off-axis neck portions to produce a blazed diffraction.

Because the light modulator is switched between the reflection mode and the blazed diffraction mode and because the reflection mode diffracts small quantities of light into the same angles as does the blazed diffraction mode, a contrast between the non-activated state and the activated state is less than an optimum contrast. Further, the off-axis neck portions are critical to operation of the light modulator which necessitate tight tolerances for the off-axis neck portions making the light modulator relatively difficult to fabricate and also relatively expensive to fabricate.

What is needed is a blazed diffractive light modulator which provides higher contrast.

What is needed is a blazed diffractive light modulator which is easier to fabricate.

What is needed is a blazed diffractive light modulator which is more economical to fabricate.

SUMMARY OF THE INVENTION

The present invention is a light modulator. The light modulator includes elongated elements arranged parallel to each other and suspended above a substrate. The light modulator operates in a first diffraction mode and in a second diffraction mode. In the first diffraction mode, an incident light diffracts into at least two diffraction orders. In the second diffraction mode, the incident light diffracts into a single diffraction order, which is at a diffraction angle different from diffraction angles for the at least two diffraction orders.

Each of the elongated elements comprises a blaze profile. Preferably, the blaze profile comprises a stepped profile across a width of each of the elongated elements where the blaze profile produces an effective blaze at a blaze angle. Alternatively, the blaze profile comprises a surface angled at the blaze angle.

Each blaze profile comprises a reflective surface. Each of selected ones of the elongated elements comprise a first conductive element along the elongated element. The elongated elements are coupled to the substrate. The substrate comprises a second conductive element.

The elongated elements produce the first diffraction when a first electrical bias, preferably a zero electrical bias, is applied between the first conductive elements of the selected ones of the elongated elements and the second conductive element. A relative height of the blazed portions are adjusted to produce the second diffraction when a second electrical bias is applied between the first conductive elements of the selected ones of the elongated elements and the second conductive element.

In an alternative embodiment, multiple elongated elements are arranged in groupings. Each of the groupings includes at least three of the elongated elements and each grouping includes an identical number of the elongated elements. Each of the elongated elements in the alternative embodiment includes the first conductive element. When the multiple elongated elements of each of the groupings are at a first height, the incident light reflects from the elongated elements. When relative heights of the multiple elongated elements of each of the groupings are adjusted by applying individual electrical biases between the first conductive elements and the second conductive element, the incident light diffracts into a single diffraction order.

BRIEF DESCRIPTION OF THE DRAWINGS

FIG. 2A illustrates an isometric view of a single elongated element and an underlying substrate of the preferred blazed grating light valve of the present invention.

FIG. 2B further illustrates the single elongated element and the underlying substrate of the present invention.

FIGS. 6A, 6B, and 6C illustrate a plan view and two orthogonal cross-sectional views, respectively, of a first partially fabricated blazed grating light valve of the present invention.

FIGS. 7A, 7B, and 7C illustrate a plan view and two orthogonal cross-sectional views, respectively, of a second partially fabricated blazed grating light valve of the present invention.

FIGS. 8A, 8B, and 8C illustrate a plan view and two orthogonal cross-sectional views, respectively, of a third partially fabricated blazed grating light valve of the present invention.

FIGS. 9A, 9B, and 9C illustrate a plan view and two orthogonal cross-sectional views, respectively, of a fourth partially fabricated blazed grating light valve of the present invention.

FIGS. 10A, 10B, and 10C illustrate a plan view and two orthogonal cross-sectional views, respectively, of a fabricated blazed grating light valve of the present invention.

DETAILED DESCRIPTION OF THE PREFERRED EMBODIMENT

Figure 1:
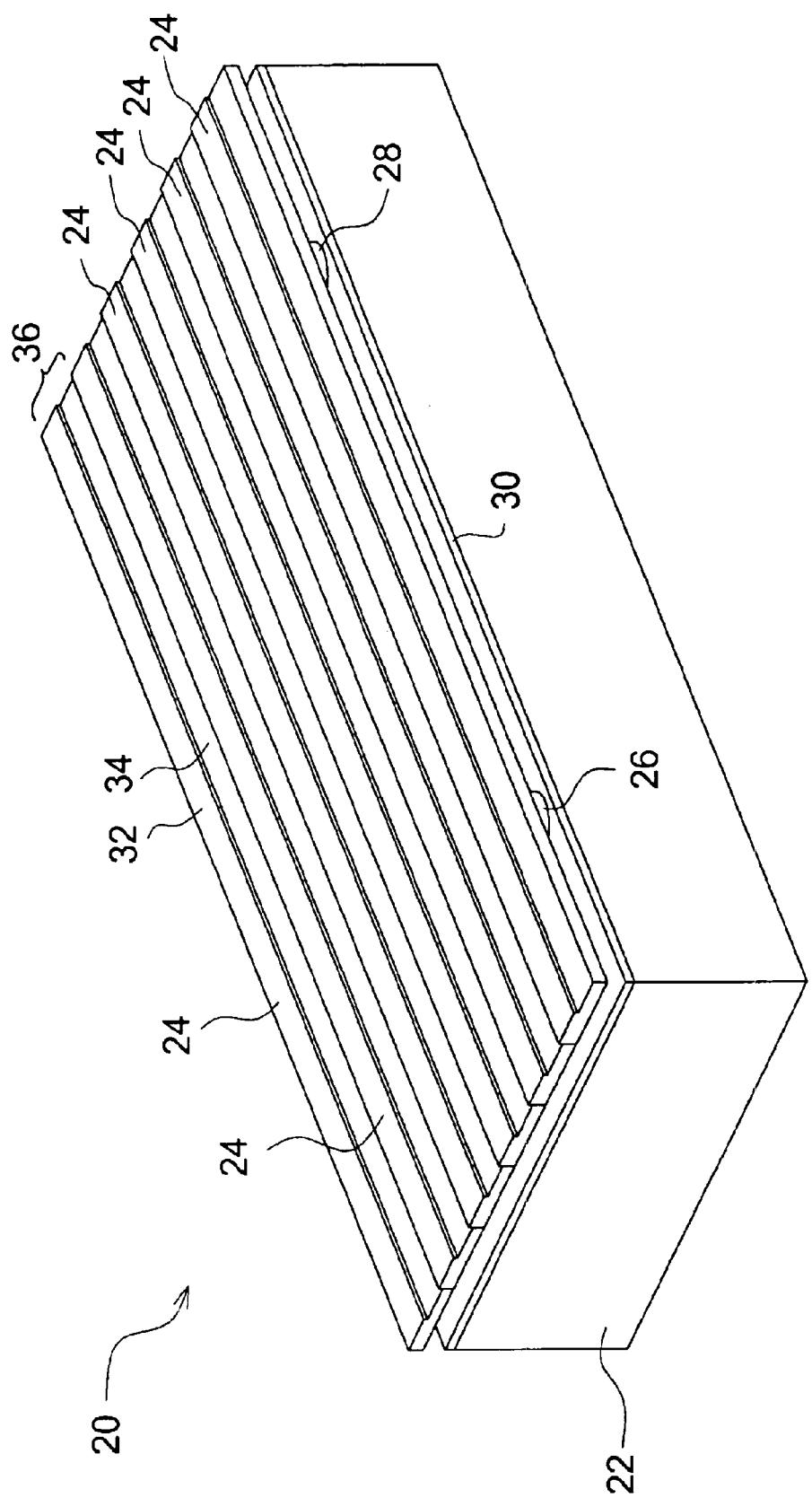
FIG. 1 illustrates an isometric view of the preferred blazed grating light valve (GLV) of the present invention.

The preferred blazed grating light valve is illustrated isometrically in FIG. 1. The preferred blazed grating light valve 20 includes a substrate 22, elongated elements 24, first posts 26 (one shown), and second posts 28 (one shown). The substrate 22 includes a first conductor 30. The elongated elements 24 each preferably include a first surface 32 and a second surface 34, both of which are reflective. The first and second surfaces, 32 and 34, form a blaze profile 36 for each of the elongated elements 24. One of the first posts 26 and one of the second posts 28 couple each of the elongated elements 24 to the substrate 22. Each of the elongated elements 24 are also preferably coupled to the substrate 22 at first and second ends (not shown) of the elongated element 24.

One of the elongated elements 24 and a portion of the substrate 22 are further illustrated isometrically in FIG. 2A. The elongated element 24 includes the first and second surfaces, 32 and 34, both of which are reflective. The first and second surfaces, 32 and 34, form the blaze profile 36. The elongated element 24 is coupled to the substrate by the first and second posts, 26 and 28, and also at the first and second ends (not shown). Preferably, the elongated element 24, the first post 26, and the second post 28 are comprised of a resilient material. Preferably, the resilient material comprises silicon nitride. Preferably, the first and second surfaces, 32 and 34, comprise a reflector. Preferably, the reflector comprises an aluminum layer. Alternatively, the reflector is a different metal. Further alternatively, the reflector is a multilayered dielectric reflector. The substrate 22 includes the first conductor 30. Preferably, the substrate 22 comprises silicon and the first conductive layer comprises doped poly-silicon. For a visible spectrum application, the elongated element 24 preferably has a length from the first post 26 to the second post of about 200 μm and a width of about 4.25 μm.

The elongated element 24 and the substrate 22 are further illustrated in FIG. 2B. The elongated element 24 preferably comprises a central portion 42 and first and second outer portions, 44 and 46. The first outer portion 44 is preferably coupled to the substrate 22 at the first end 38 and the first post 26. The second outer portion is preferably coupled to the substrate 22 at the second end 40 and the second post 28. Preferably, the first and second outer portions, 44 and 46, are also coupled to the substrate 22 by first and second anchors, 29 and 31, located proximate to the first and second ends, 38 and 40, respectively. Preferably, the first and second anchors, 29 and 31, have an oval cross-section with a long axis of the oval cross-section oriented parallel to a length of the elongated elements 24. By orienting the long axes of the first and second anchors parallel the length of the elongated elements 24, the first and second anchors, 29 and 31, are relatively stiff in a tension direction defined by the internal tensile stress within the elongated elements 24. Preferably, lengths of the first and second outer portion, 44 and 46, are about as long as the central portion 42. Alternatively, the lengths of the first and second outer portion, 44 and 46, are longer or shorter than the central portion 42. The first and second outer portions, 44 and 46, assure uniform fabrication of the first and second posts, 26 and 28, and the elongated elements 24 in the vicinity of the first and second posts, 26 and 28, and in between the first and second posts, 26 and 28.

Figure 3:
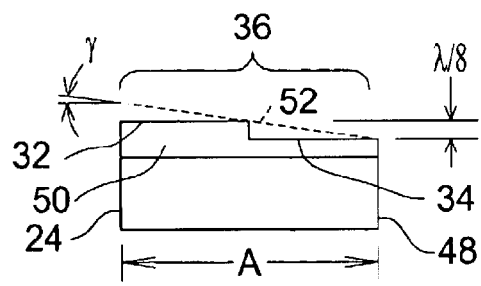
FIG. 3 illustrates a cross section of an elongated element of the present invention.

A cross-sectional view of the elongated element 24 of the present invention is illustrated in FIG. 3. The elongated element 24 preferably comprises a rectangular body 48 and a stepped reflector 50. The rectangular body preferably comprises silicon nitride and the stepped reflector 50 preferably comprises aluminum. The stepped reflector 50 forms the first and second surfaces, 32 and 34, of the elongated element 24. The first and second surfaces, 32 and 34, are preferably separated by a height difference of an eighth wavelength λ/8 of an incident light. The first and second surfaces, 32 and 34, form the blaze profile 36. The blaze profile 36 forms an effective blaze surface 52 at a blaze angle γ. The blaze angle γ is given by the expression: γ=arctan (λ/(4A)).

Figure 4A:
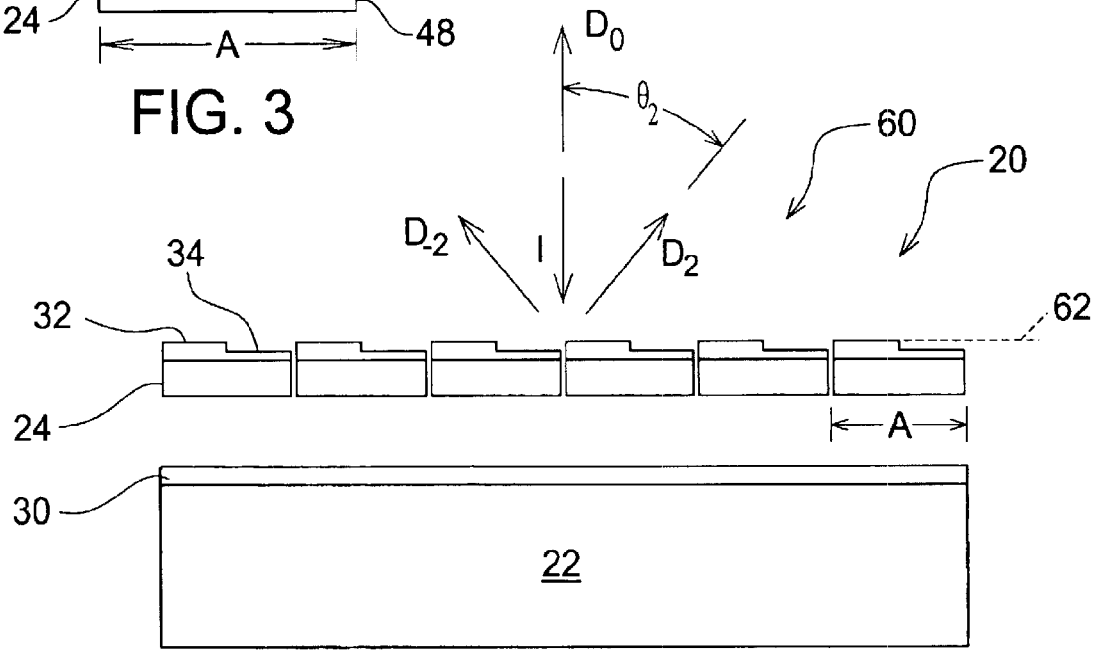
FIGS. 4A and 4B illustrate a cross-sectional view of the preferred blazed grating light valve of the present invention in a non-activated state and in a fully activated state, respectively, where an incident light is normal to a grating plane.

A first cross-sectional view of the preferred blazed grating light valve 20 of the present invention is illustrated in FIG. 4A. The first cross-sectional view 60 illustrates the preferred grating light valve 20 in a non-activated state with the elongated elements 24 on a grating pitch A and with the first surfaces 32 defining a grating plane 62. In the non-activated state, there is preferably a zero electrical bias between the elongated elements 24 and the first conductor 30. The incident light I of wavelength λ illuminates the preferred blazed grating light valve 20 normal to the grating plane 62. The preferred blazed grating light valve 20 diffracts light into diffraction orders. For discussion purposes, the diffraction orders are based on a second grating pitch 2A, which is twice the grating pitch A.

In the non-activated state, the incident light I of the wavelength λ is diffracted into a zeroth diffraction order $D_0$, a second diffraction order diffraction $D_2$, and a minus second order diffraction $D_{-2}$. The zeroth order diffraction $D_0$ is normal to the grating plane 62. The second order diffraction $D_2$ and the minus second order diffraction $D_{-2}$ are at a second order diffraction angle $\theta_2$ given by the expression: $\theta_2$=arcsin (λ/A). For the preferred blazed grating light valve 20, the second order diffraction angle $\theta_2$ is less than about 15°. Thus, for the preferred blazed grating light valve 20, the second order diffraction angle $\theta_2$ is approximately four times the blaze angle γ.

Neglecting a first light loss due to absorption by the stepped reflectors 50 and a second light loss by the incident light I passing through gaps between adjacent pairs of the elongated elements 24, half of the incident light I is diffracted into the zeroth diffraction order $D_0$ while a quarter of the incident light I is diffracted into each of the second diffraction order $D_2$ and the minus second diffraction order $D_{-2}$.

Figure 4B:
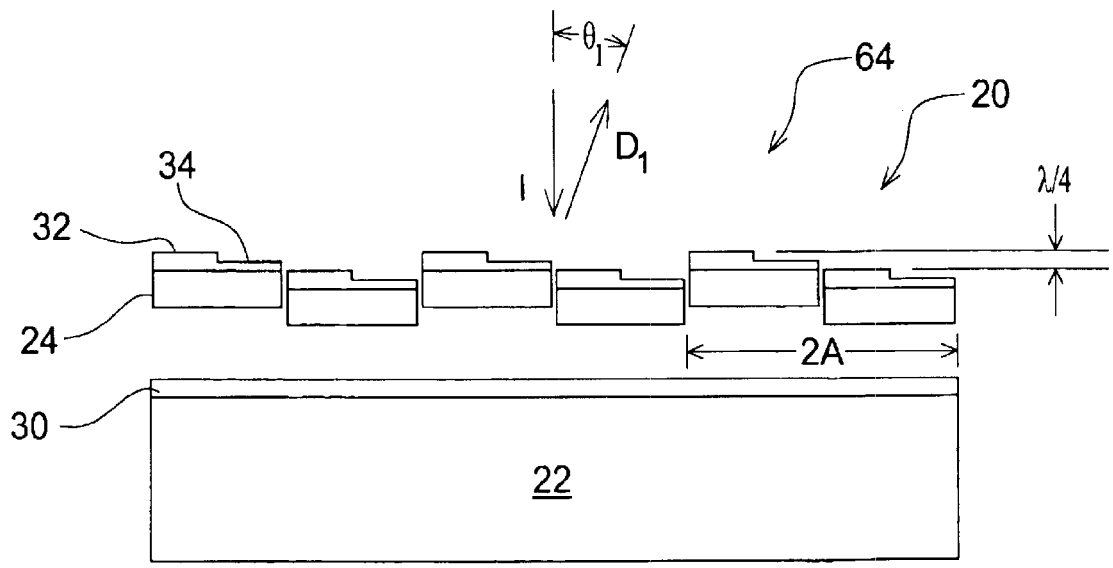

A second cross-sectional view of the preferred blazed grating light valve 20 of the present invention is illustrated in FIG. 4B. The second cross-sectional view 64 illustrates the preferred grating light valve 20 in an activated state. Preferably, to produce the activated state, alternate ones of the elongated elements 24 are moved toward the substrate 22 by applying an electrical bias between the first conductor 30 and the reflective surface 42 of the alternate ones of the elongated elements 24. In a fully activated state, the electrical bias moves the alternate ones of the elongated elements 24 by a quarter wavelength $\lambda/4$ of the incident light I. This results in pairs of the elongated elements 24 forming an effective fully activated height difference of a half wavelength $\lambda/2$ of the incident light I at the blaze angle $\gamma$.

In the fully activated state, the incident light I of the wavelength $\lambda$ is diffracted into a first diffraction order $D_1$ having a first order angle $\theta_1$. The first order angle $\theta_1$ is given by the expression: $\theta_1 = \arcsin(\lambda/2\Lambda)$. For the preferred grating light valve 20 as described here, the first order angle $\theta_1$ is approximately twice the blaze angle $\gamma$.

Figure 5A:
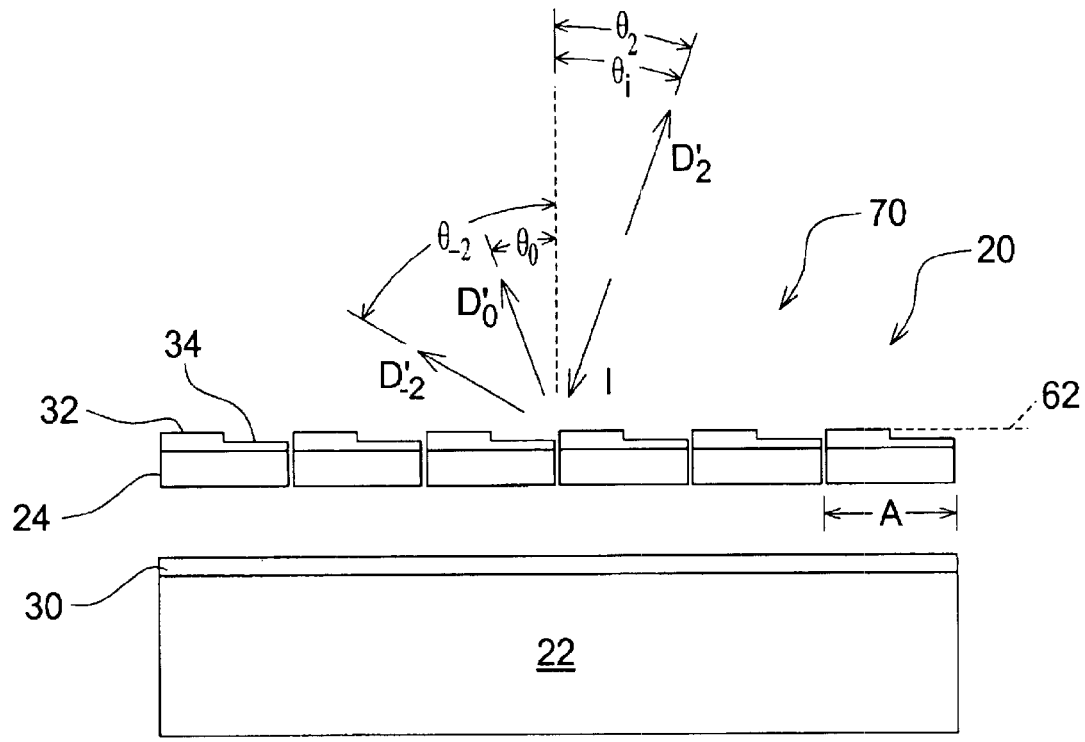
FIGS. 5A and 5B illustrate the cross-sectional view of the preferred blazed grating light valve of the present invention in the non-activated state and in the fully activated state, respectively, where the incident light is at an oblique angle such that, in the non-activated state, diffracted light is placed in a zero order diffraction and further such that, in the fully activated state, light is placed in a first order diffraction, which is normal to the grating plane.

A third cross-sectional view of the preferred blazed grating light valve 20 of the present invention is illustrated in FIG. 5A. The third cross-sectional view 70 illustrates the preferred blazed grating light valve 20 in the non-activated state with the incident light I at an oblique angle $\theta_i$ to the grating plane 62. In the non-activated state, the incident light I is diffracted into an oblique zeroth order diffraction $D_0'$, and an oblique second order diffraction $D_2'$, and an oblique minus second order diffraction $D_{-2}'$. The oblique zeroth order diffraction $D_0'$ is at an oblique zeroth order angle $\theta_0'$ with respect to the normal to the grating plane 62, which is equal to the oblique angle $\theta_i$. The oblique zeroth order angle $\theta_0'$ and oblique angle $\theta_i$ are given by the expression: $\theta_0' = \theta_i = \arcsin(\lambda/2\Lambda)$. The oblique second order diffraction $D_2'$ is at the oblique angle $\theta_i$. The oblique minus second order diffraction $D_{-2}'$ is at an oblique minus second order angle $\theta_{-2}'$, which is twice the zeroth order angle $\theta_0'$.

Figure 5B:
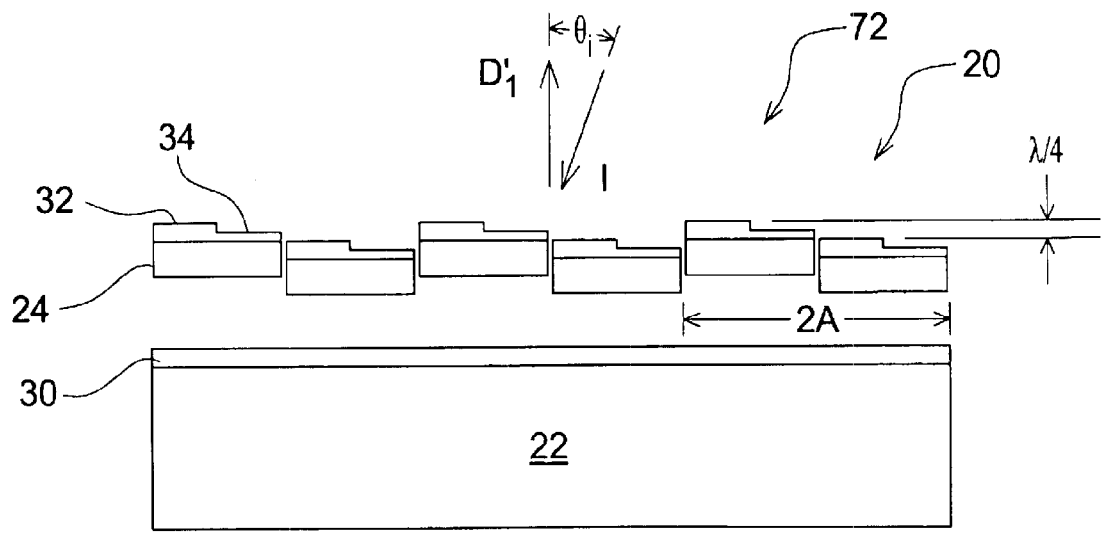

A fourth cross-sectional view of the preferred blazed grating light valve 20 of the present invention is illustrated in FIG. 5B. The fourth cross-sectional view 72 illustrates the preferred blazed grating light valve 20 in the activated state with the incident light I at the oblique angle $\theta_i$ to the grating plane 62. In the fully activated state, the incident light I is diffracted into an oblique first order diffraction $D_1'$, which is normal to the grating plane 62.

A first advantage of the preferred blazed grating light valve 20 is that the preferred blazed grating light valve 20 provides a blazed diffraction in the activated state while quickly switching between the non-activated state and the activated state. This is because the elongated elements are translated rather than rotated.

A second advantage of the preferred blazed grating light valve 20 is that in the non-activated state none of the incident light I is diffracted into the first diffraction order $D_1$ for the normal incidence and none of the incident light I is diffracted into the oblique first order diffraction $D_1'$ for the oblique incidence. In a display application where the preferred blazed grating light valve 20 produces an array of pixels and where a bright pixel corresponds to either the first diffraction order $D_1$ or the oblique first order diffraction $D_1'$, this provides a dark pixel of an image. In a telecommunications application, where the preferred blazed grating light valve 20 operates as a switch and where an on-state of the switch corresponds to either the first diffraction order $D_1$ or the oblique first order diffraction $D_1'$, this provides an off-state for the switch.

A third advantage of the preferred blazed grating light valve 20 is that, in the activated state, the incident light I is diffracted into a single diffraction order which is either the first diffraction order $D_1$ for the normal incidence or the oblique first order diffraction $D_1'$ for the oblique incidence. In the display application where the preferred blazed grating light valve 20 produces the array of pixels and where the bright pixel corresponds to either the first diffraction order $D_1$ or the oblique first order diffraction $D_1'$, this simplifies display optics since only the single diffraction order is collected to produce the bright pixel. In the telecommunications application, where the preferred blazed grating light valve 20 operates as the switch and where the on-state of the switch corresponds to either the first diffraction order $D_1$ or the oblique first order diffraction $D_1'$, this provides efficient utilization of the incident light I since the incident light I is diffracted into the single diffraction order.

A fourth advantage of the preferred blazed grating light valve is that because, in the non-activated state, none of the incident light I is diffracted into either the first diffraction order $D_1$ for the normal incidence or the oblique first order diffraction $D_1'$ for the oblique incidence and because, in the activated state, the incident light I is diffracted into the single diffraction order, the preferred blazed grating light valve 20 provides a high contrast ratio between the non-activated state and the activated state. Typically, this contrast ratio is on an order of a thousand to one. In the display application where the preferred blazed grating light valve 20 produces the array of pixels and where the bright pixel corresponds to either the first diffraction order $D_1$ or the oblique first order diffraction $D_1'$, this produces a high contrast image. In the telecommunications application, where the preferred blazed grating light valve 20 operates as the switch and where the on-state of the switch corresponds to either the first diffraction order $D_1$ or the oblique first order diffraction $D_1'$, this produces a high discrimination between the on-state and the off-state.

A fifth advantage of the preferred blazed grating light valve 20 is that, because the activated state diffracts the incident light I into the single diffraction order, a depth of focus of either the first diffraction order $D_1$ for the normal incidence or the oblique first order diffraction $D_1'$ for the oblique incidence is relatively long compared to a diffractive light modulator which diffracts useful light into multiple diffraction orders. In the display application where the preferred blazed grating light valve 20 produces the array of pixels and where the bright pixel corresponds to either the first diffraction order $D_1$ or the oblique first order diffraction $D_1'$, this allows for simpler optics. In a printing application, which is a type of display application where the bright pixel is typically used to illuminate a cylindrical drum, the longer depth of focus provides a sharper printed image.

A first partially fabricated blazed grating light valve of the present invention is illustrated in FIGS. 6A, 6B, and 6C. Fabrication of the first partially fabricated grating light valve 80 begins with a silicon substrate 82. Next, a field oxide layer 84 is formed on the silicon substrate 82 by preferably heating the silicon substrate in an oxygen atmosphere. Preferably, the field oxide layer has a thickness of about 1.0 $\mu$m. Following this, a conducting layer 86 is deposited on the field oxide layer 84. Preferably, the conducting layer 86 has a thickness of about 0.35 $\mu$m and comprises doped poly-silicon deposited using an LPCVD (low pressure chemical vapor deposition) process. Subsequently, an etch stop 88 is formed on the conducting layer 86. Preferably, the etch stop 88 comprises a second field oxide layer formed by heating the poly-silicon in the oxygen environment. Preferably, the etch stop 88 has a thickness of about 200 Å. Next, a sacrificial layer 90 is deposited on the etch stop 88. Preferably, the sacrificial layer 90 comprises poly-silicon deposited using the LPCVD process. Preferably, the sacrificial layer 90 has a thickness about 1.0 μm. Alternatively, the sacrificial layer has a thickness greater than or about equal to a wavelength λ of the incident light I.

A second partially fabricated blazed grating light valve of the present invention is illustrated in FIGS. 7A, 7B, and 7C. Fabrication of the second partially fabricated grating light valve 92 begins with the first partially fabricated blazed grating light valve 80 (FIGS. 6A, 6B, and 6C). Fabrication of the second partially fabricated grating light valve 92 comprises first and second etching steps using photolithography and a semiconductor etching technique, such as plasma etching. The first etching step etches step producing features 93 into the sacrificial layer 90. Preferably, the step producing features 93 have a height of an eighth wavelength λ/8 of the incident light I. For example, if the incident light is green light having a wavelength λ of 5,280 Å, the height of the step producing features 93 is preferably 660 Å. The second etching step etches post holes 94 into the sacrificial layer 90 and also etches anchor holes (not shown) into the sacrificial layer 90. The anchor holes form the first and second anchors, 29 and 31 (FIG. 2B). The second etching step also etches sacrificial layer edges (not shown) where first and second ends, 38 and 40, of each of the elongated elements 24 couple to the substrate 22 (FIG. 2B).

A third partially fabricated blazed grating light valve of the present invention is illustrated in FIGS. 8A, 8B, and 8C. Fabrication of the third partially fabricated blazed grating light valve 100 begins with the second partially fabricated blazed grating light valve 92 (FIGS. 7A, 7B, and 7C). Fabrication of the third partially fabricated blazed grating light valve 100 comprises depositing a resilient material 102 on the second partially fabricated grating light valve 92 and then depositing a metal 104 on the resilient material 102. Preferably, the resilient material 102 comprises silicon nitride. Preferably, the resilient material 102 coats surfaces of the post holes 94 and the anchor holes of the second partially fabricated grating light valve 92. Alternatively, the resilient material 102 more substantially fills the post holes 94 and the anchor holes. Further alternatively, the resilient material fills the post holes 94 and the anchor holes. (Note that FIGS. 8A and 8B depict the resilient material 102 filling the post holes 94 as a simplification for more easily understood illustrations.) Preferably, the resilient material has a tensile stress of about 1 GPa. Preferably, the resilient material 102 has a thickness of about 920 Å and is deposited using an LPCVD process. Preferably, the metal 104 comprises aluminum having a thickness of about 500 Å. Preferably, the metal 104 is deposited using a physical vapor deposition technique.

A fourth partially fabricated blazed grating light valve of the present invention is illustrated in FIGS. 9A, 9B, and 9C. Fabrication of the fourth partially fabricated blazed grating light valve 110 begins with the third partially fabricated blazed grating light valve 100 and comprises etching the metal 104 and the resilient material 102 to form fabricated elongated elements 24A supported by the sacrificial layer 90.

A fabricated blazed grating light valve of the present invention is illustrated in FIGS. 10A, 10B, and 10C. Fabrication of the fabricated blazed grating light valve 116 begins with fourth partially fabricated blazed grating light valve 110 and comprises etching the sacrificial layer 90 to completion using a xenon difluoride etch. This produces the fabricated elongated elements 24A coupled to a fabricated substrate 22A by fabricated first and second posts, 26A and 28A, with each of the fabricated elongated elements 24A comprising first and second fabricated surfaces, 32A and 34A.

It will be readily apparent to one skilled in the art that suitable electrical connections for the fabricated blazed grating light valve 116 comprise bond pads, which are well known both in structure and fabrication. Further, it will be readily apparent to one skilled in the art that the fabricated blazed grating light valve 116 is a particular embodiment of the present invention and that accordingly the preferred blazed grating light valve 20 more generally describes the present invention.

Figure 11:
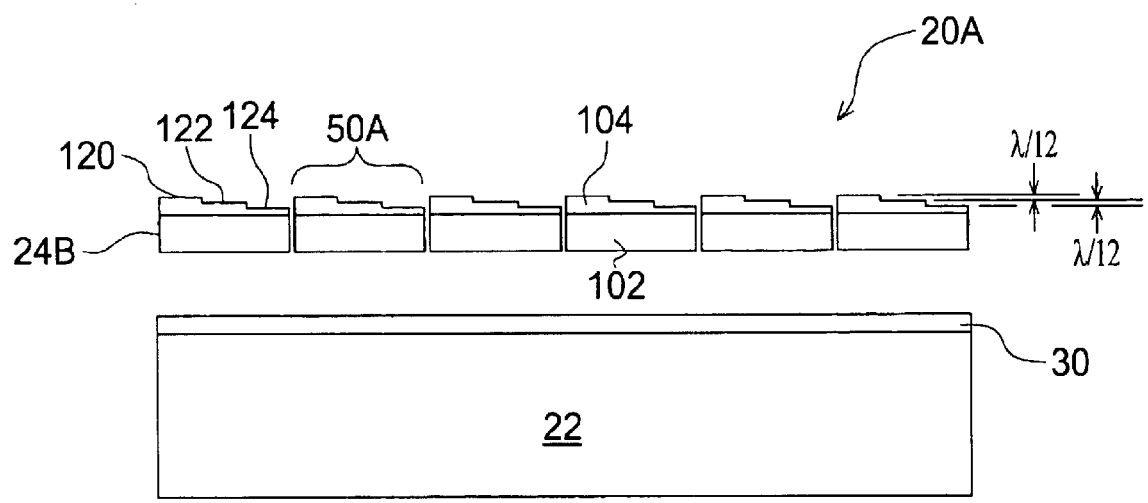
FIG. 11 illustrates a first alternative grating light valve of the present invention.

A cross-sectional view of a first alternative blazed grating light valve of the present invention is illustrated in FIG. 11. The first alternative blazed grating light valve 20A replaces the elongated elements 24 of the preferred blazed grating light valve 20 with first alternative elongated elements 24B. The first alternative elongated elements 24B comprise a three-step profile 50A having first, second, and third alternative surfaces, 120, 122, and 124. A height difference between the first and second alternative surfaces, 120 and 122, and between the second and third alternative surfaces, 122 and 124, is preferably a twelfth wavelength λ/12 of the incident light I. Thus, the three step profile 50A forms an alternative blazed profile of the present invention.

It will be readily apparent to one skilled in the art that additional steps may be added to the first alternative elongated elements 24B with a corresponding adjustment in height between adjacent surfaces.

Figure 12:
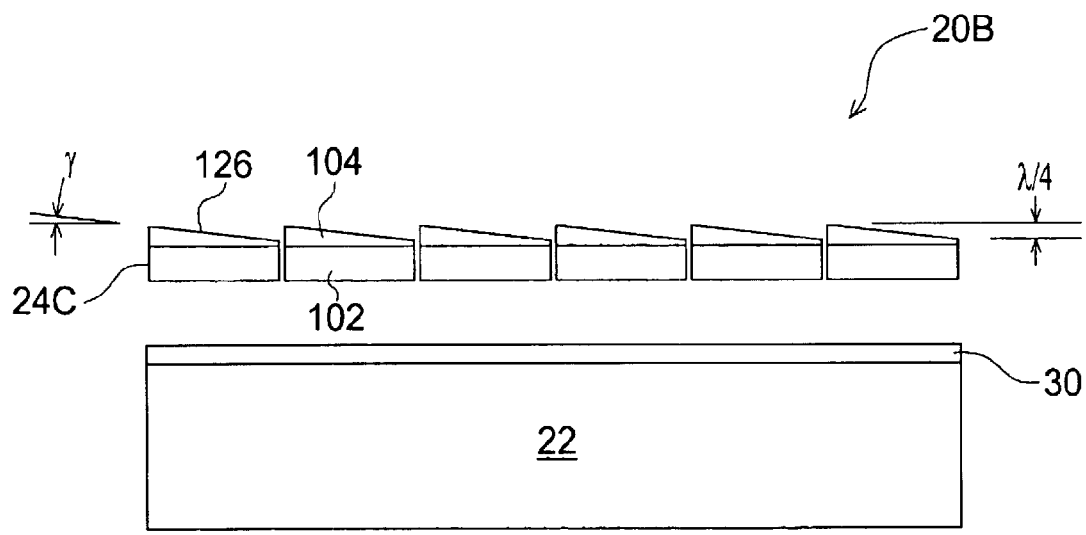
FIG. 12 illustrates a second alternative grating light valve of the present invention.

A second alternative blazed grating light valve of the present invention is illustrated in FIG. 12. The second alternative blazed grating light valve 20B replaces the elongated elements 24 of the preferred blazed grating light valve 20 with second alternative elongated elements 24C. The second alternative elongated elements 24C replace the stepped profile 50 of the elongated elements 24 with a flat surface 126 at the blaze angle γ.

Figure 13:
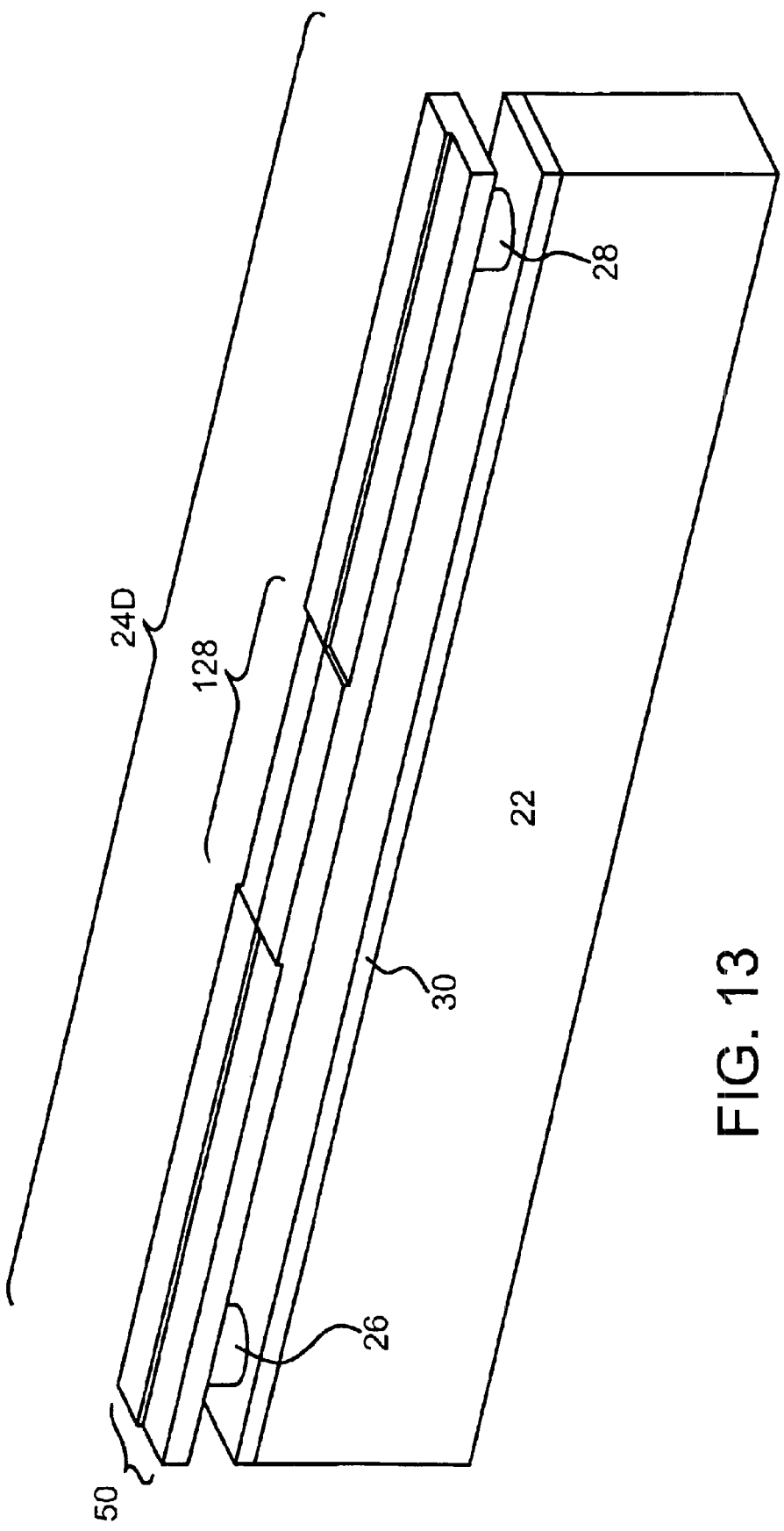
FIG. 13 illustrates an alternative elongated element and the underlying substrate of the present invention.

A third alternative blazed grating light valve of the present invention replaces the elongated elements 24 of the preferred blazed grating light valve 20 with third alternative elongated elements. One of the third alternative elongated elements and the substrate 22 are illustrated in FIG. 13. The third alternative elongated element 24D reverses the stepped profile 50 of a central region 128 outside of the central region 128. In the activated state, the third alternative blazed grating light valve diffracts the incident light I within the central region 128 into the first diffraction order $D_1$ at the first order angle $θ_1$ while diffracting the incident light I just outside the central region 128 at minus the first order angle $θ_1$. Thus, much of the incident light I diffracted between the first post 26 and the central region and between the central region 128 and the second post 28 is directed away from the first order angle $θ_1$, reducing unwanted stray light in downstream optics.

Figure 14A:
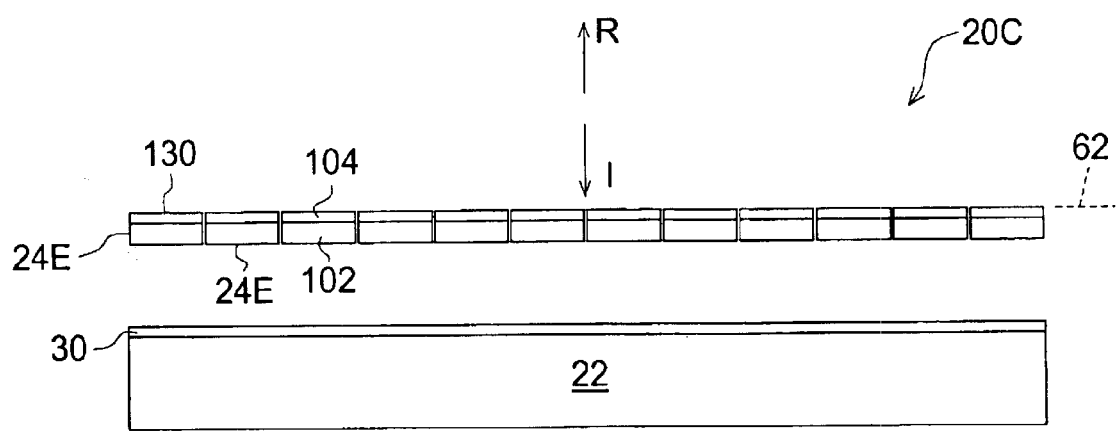
FIG. 14A illustrates a third alternative grating light valve in a reflection state.

A fourth alternative blazed grating light valve of the present invention is illustrated in FIG. 14A. The fourth alternative blazed grating light valve 20C comprises fourth alternative elongated elements 24E. The fourth alternative elongated elements 24E each comprise a flat reflective surface 130, which in the non-activated state shown in FIG. 14A, places the flat reflective surfaces 130 in the grating plane 62. When the fourth alternative blazed grating light valve 20C is in the non-activated state and is illuminated by the incident light I, the fourth alternative grating light valve 20C produces the reflected light R.

Figure 14B:
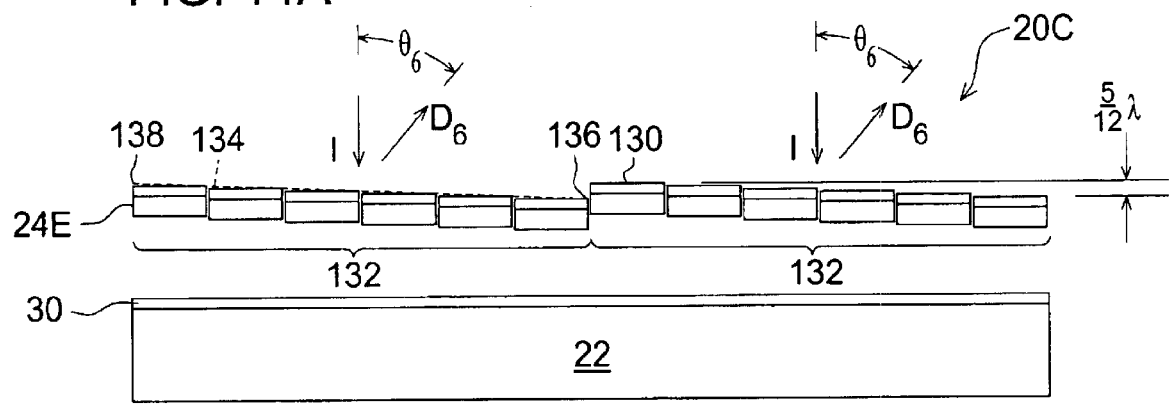
FIG. 14B illustrates the third alternative grating light valve in a first diffractive state, which places diffracted light into a diffraction angle.

The fourth alternative blazed grating light valve 20C of the present invention is further illustrated in FIG. 14B showing the fourth alternative blazed grating light valve 20C in a first activated state. The fourth alternative blazed grating light valve 20C provides dynamic control of the fourth alternative elongated elements 24E so that variable groupings of the fourth alternative elongated elements 24E produce a variable angle blazed diffraction. In the first activated state, six element groups 132 of the fourth alternative elongated elements 24E produce a six element blazed diffraction $D_6$ having a diffraction angle $\theta_6$. Since the six element groups 132 approximate an effective blaze 134, a height difference from a first point 136 to a second point 138 on the effective blaze 134 is a half wavelength $\lambda/2$ of the incident light I. Thus, an actual height difference between lowest and highest elongated elements 24E is preferably five twelfths wavelength $5\gamma/12$ of the incident light I.

In general, an nth element blazed diffraction produces first diffracted light having an nth diffraction angle $\theta_n$. The nth diffraction angle $\theta_n$ is given by the expression:

$$\theta_n = \arcsin(\lambda/(n(w+s)))$$

where $\lambda$=wavelength of the incident light I, n=number of elements in an n element group, w=width of each of the fourth alternative elongated elements 24E, and s=space between adjacent pairs of the fourth alternative elongated elements 24E.

To produce the nth diffracted light, an nth element group is preferably arranged with outer ones of the fourth alternative elongated elements 24E having an nth element group height difference ($d_n$) given by the expression:

$$d_n = (n-1)(\lambda/(2n))$$

In a particular embodiment of the fourth alternative blazed grating light valve 20C, the fourth alternative elongated elements 24E have the width w of 2.0 μm and the spaces s of negligible length. Table 1 provides the diffraction angle $\theta_n$ and the group height difference $d_n$ for a 5,280 Å green light and the n element grouping of four, five, six, and seven elements.

TABLE 1

| n | $\theta_n$ | $d_n$ |
|---|---|---|
| 4 | 3.78° | 1,980 Å |
| 5 | 3.03 | 2,112 |
| 6 | 2.52 | 2,200 |
| 7 | 2.16 | 2,263 |

Figure 14C:
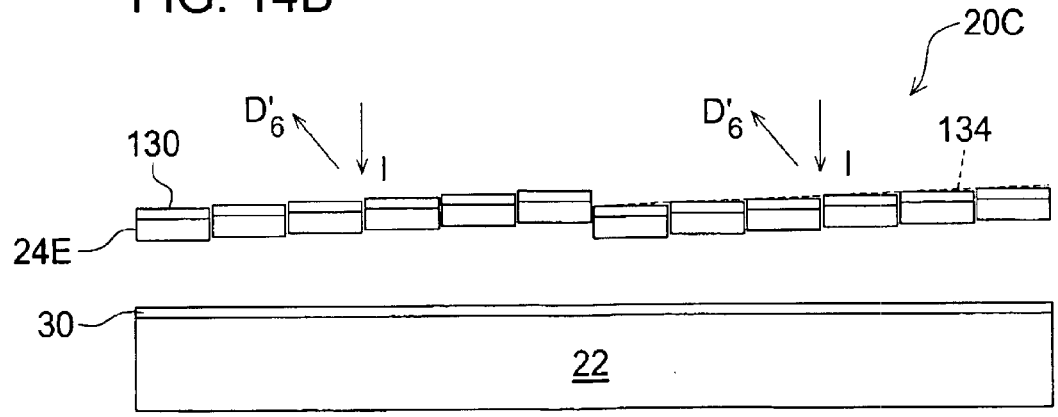
FIG. 14C illustrates the third alternative grating light valve in a second diffractive state, which places diffracted light into minus the diffraction angle.

The fourth alternative blazed grating light valve 20C of the present invention is further illustrated in FIG. 14C showing the fourth alternative blazed grating light valve 20C in a second activated state. In the second activated state, the effective blaze 134 has been reversed by reversing heights of the fourth alternative elongated elements 24E of the six element groups 132 to produce a reverse six element blazed diffraction $D_6'$. Thus, the dynamic control of the fourth alternative elongated elements 24E provides an ability to reverse the effective blaze 134 and doubles a number of discrete diffraction angles which the fourth alternative blazed grating light valve 20C provides.

In a telecommunications application, the fourth alternative blazed grating light valve 20C functions as a variable switch. For example, using the four, five, six, and seven element groups in reversible configurations allows for eight diffractive angles, which provides an eight channel switch. Further, the fourth alternative grating light valve 20C can be cascaded with eight additional fourth alternative blazed grating light valves 20C to form a sixty-four channel switch.

It will be readily apparent to one skilled in the art that other various modifications may be made to the preferred embodiment without departing from the spirit and scope of the invention as defined by the appended claims.

We claim:

1. A light modulator comprising:
   a. elongated elements arranged parallel to each other and configured in a grating plane, each elongated element comprising a reflective surface such that in operation an incident light diffracts into at least two diffraction orders; and
   b. means for adjusting a height of selected ones of the elongated elements relative to the grating plane such that in operation the incident light diffracts into a single non-zero diffraction order different than the at least two diffraction orders.

2. The light modulator of claim 1 wherein the means for adjusting the height of the selected ones of the elongated elements comprise:
   a. a first conductive element along at least a portion of each of the selected ones of the elongated elements; and
   b. a substrate coupled to the elongated elements, the substrate comprising a second conductive element such that an electrical bias applied between the first conductive elements and the second conductive element adjusts the height of the selected ones of the elongated elements.

3. The light modulator of claim 2 further comprising first and second posts, the first and second posts coupling the elongated elements to the substrate.

4. The light modulator of claim 1 wherein the selected ones of the elongated elements comprise every other ones of the elongated elements.

5. The light modulator of claim 1 wherein the reflective surfaces of each of the elongated elements comprise a blaze profile.

6. The light modulator of claim 5 wherein the blaze profile comprises at least two planar surfaces.

7. The light modulator of claim 6 wherein the two planar surfaces comprise planes parallel to the grating plane.

8. The light modulator of claim 5 wherein the reflective surface of the blaze profile comprises a single planar surface at a blaze angle with respect to the grating plane.

9. The light modulator of claim 1 wherein two times a width of each of the elongated elements comprises a grating pitch.

10. The light modulator of claim 9 wherein the at least two diffraction orders comprise a zeroth order diffraction and one of a plus or minus second order diffraction.

11. The light modulator of claim 10 wherein the single diffraction order comprises a first order diffraction.

12. A light modulator comprising:
   a. elongated elements arranged parallel to each other and configured in a grating plane, each of selected ones of the elongated elements comprising a first conductive element each elongated element comprising a reflective surface such that in operation an incident light diffracts into at least two diffraction orders; and
   b. a substrate coupled to the elongated elements and comprising a second conductive element such that in operation an electrical bias applied between the first conductive elements and the second conductive element adjusts a height of the selected ones of the elongated elements relative to the grating plane and further such that in operation the incident light diffracts into a single non-zero diffraction order different than the at least two diffraction orders.

13. A light modulator comprising:

a. elongated elements arranged parallel to each other in a grating plane, each elongated element comprising a blaze profile, each blaze profile comprising a reflective surface, each of selected ones of the elongated elements comprising a first conductive element along the blaze profile, the blaze profile comprising at least two planar surfaces, the two planar surfaces comprising planes parallel to the grating plane such that in operation an incident light diffracts into at least two diffraction orders; and b. a substrate coupled to the elongated elements, the substrate comprising a second conductive element such that, when an electrical bias applied between the first conductive elements and the second conductive element adjusts a height of the selected ones of the elongated elements, the incident light diffracts into a single non-zero diffraction order different than the at least two diffraction orders.

14. A light modulator comprising:

a. means for diffracting an incident light into at least two diffraction orders; and b. means for adjusting the means for diffracting such that the incident light diffracts into a single non-zero diffraction order different than the at least two diffraction orders.

15. A light modulator comprising:

a. elongated elements arranged parallel to each other and dynamically configurable into one of a plurality of group configurations of the elongated elements, each elongated element comprising a reflective surface such that in operation an incident light illuminating the elongated elements produces a reflected light when the elongated elements are at a first height, each group configuration comprises a different number of at least three elongated elements within the group configuration, and the light modulator is configured according to a single group configuration at a time; and b. means for adjusting a relative height of the elongated elements of each of the groupings such that in operation the incident light illuminating the elongated elements produces a single diffraction order selectable between a first diffraction angle and minus the first diffraction angle.

16. The light modulator of claim 15 wherein the means for adjusting the relative heights of the elongated elements of the groupings of the elongated elements comprises:

a. first conductive elements along at least a portion of the elongated elements; and b. a substrate coupled to the elongated elements and comprising a second conductive element such that in operation the relative heights of the elongated elements of each of the groupings are adjusted by applying individual electrical biases between the first conductive elements of the grouping and the second conductive element.

17. The light modulator of claim 16 wherein the reflective surfaces of the elongated elements comprises a metal and further wherein the metal comprises the first conductive elements.

18. The light modulator of claim 15 wherein the groupings of the elongated groupings comprise variable groupings of the elongated elements such that in operation first groupings of three of the elongated elements produce the single diffraction order at a first diffraction angle and further such that second groupings of four of the elongated elements produce the single diffraction order at a second diffraction angle.

19. A light modulator comprising:

a. elongated elements arranged parallel to each other and configured into one of a plurality of group configurations of the elongated elements, each elongated element comprising a reflective surface and a first conductive element, each group configuration comprising a different number of at least three elongated elements within the group configuration, and the light modulator is configured according to a single group configuration at a time; and b. a substrate coupled to the elongated elements, the substrate comprising a second conductive element such that in operation an incident light illuminating the elongated elements produces a reflected light when the elongated elements are at a first height and further such that in operation a relative height of the elongated elements of each grouping are adjusted to produce a single diffraction order when individually varying electrical biases are applied between the first conductive elements of each of the groupings and the second conductive element, wherein the single diffraction order is selectable between a first diffraction angle and minus the first diffraction angle.

20. A light modulator comprising:

a. means for reflecting an incident light including a number of elongated elements; and b. means for adjusting the means for reflecting such that the incident light diffracts into a single diffraction order selectable between a first diffraction angle and minus the first diffraction angle, wherein the first diffraction angle is variable according to the means for adjusting by changing the number of elongated elements within an elongated element group to form a new elongated element group configuration.

* * * * *